United States Patent
Esinovskaya et al.

(10) Patent No.: US 10,394,420 B2
(45) Date of Patent: Aug. 27, 2019

(54) COMPUTER-IMPLEMENTED METHOD OF GENERATING A CONTENT RECOMMENDATION INTERFACE

(71) Applicant: YANDEX EUROPE AG, Lucerne (CH)

(72) Inventors: Irina Viktorovna Esinovskaya, Moscow (RU); Andrey Dmitrievich Tarasov, Barnaul (RU); Mikhail Mikhailovich Koltsov, Saint-Petersburg (RU); Sergey Aleksandrovich Chernov, Moscow (RU); Alexey Victorovich Shcherbinin, Moscow (RU); Andrey Vadimovich Sikerin, Barnaul (RU); Yelena Vasilyevna Babenko, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/592,745

(22) Filed: May 11, 2017

(65) Prior Publication Data
US 2017/0329490 A1   Nov. 16, 2017

(30) Foreign Application Priority Data

May 12, 2016 (RU) ................................. 2016118519

(51) Int. Cl.
*G06F 3/0484* (2013.01)
*G06F 3/0481* (2013.01)
(Continued)

(52) U.S. Cl.
CPC ........ *G06F 3/04817* (2013.01); *G06F 3/0488* (2013.01); *G06F 17/30905* (2013.01); *H04L 67/02* (2013.01)

(58) Field of Classification Search
CPC combination set(s) only.
See application file for complete search history.

(56) References Cited

U.S. PATENT DOCUMENTS

| 7,007,242 B2 | 2/2006 | Suomela et al. |
| 7,328,216 B2 | 2/2008 | Hofmann et al. |
| (Continued) | | |

FOREIGN PATENT DOCUMENTS

| CN | 103077220 A | 5/2013 |
| CN | 103167330 A | 6/2013 |
| (Continued) | | |

OTHER PUBLICATIONS

Generating a Relationship-Based Recommendation, Disclosed Anonymously, Apr. 28, 2006.*

(Continued)

*Primary Examiner* — Rayeez R Chowdhury
(74) *Attorney, Agent, or Firm* — BCF LLP

(57) ABSTRACT

There is provided a computer-implemented method of generating a content recommendation interface for a user of an electronic device, the method executable by the electronic device. The content recommendation interface presents a first GUI comprising three simultaneously presented visual-interface elements disposed within the first GUI: a first interface element comprising an omnibox, a second interface element comprising at least one icon representing user-selected content, and a third interface element comprising at least one recommendation icon, the first recommendation icon associated with recommended content selected, by the recommendation server, from a plurality of potentially recommendable content items. The method further comprises, in response to an indication of a first user-interaction with the first GUI into one of a first direction and
(Continued)

a second direction, selectively presenting a first version and a second version of a second GUI, respectively.

16 Claims, 21 Drawing Sheets

(51) Int. Cl.
*G06F 3/0488* (2013.01)
*G06F 17/30* (2006.01)
*H04L 29/08* (2006.01)

(56) References Cited

U.S. PATENT DOCUMENTS

| | | | |
|---|---|---|---|
| 7,502,789 B2 | 3/2009 | Yao et al. | |
| 7,540,051 B2 | 6/2009 | Gundersen et al. | |
| D613,300 S | 4/2010 | Chaudhri | |
| 7,849,076 B2 | 12/2010 | Zheng et al. | |
| 8,010,527 B2 | 8/2011 | Denoue et al. | |
| 8,244,740 B2 | 8/2012 | Gruenhagen et al. | |
| 8,271,898 B1 | 9/2012 | Mattos et al. | |
| 8,285,602 B1 | 10/2012 | Yi et al. | |
| 8,290,818 B1 | 10/2012 | Levitan et al. | |
| 8,301,623 B2 | 10/2012 | Chakrabarti et al. | |
| 8,386,955 B1 | 2/2013 | Weber et al. | |
| 8,412,726 B2 | 4/2013 | Yan et al. | |
| 8,429,184 B2 | 4/2013 | Ismalon | |
| 8,478,664 B1 | 7/2013 | Xavier et al. | |
| 8,510,252 B1 | 8/2013 | Gargi et al. | |
| D693,833 S | 11/2013 | Inose et al. | |
| 8,600,968 B2 | 12/2013 | Holenstein et al. | |
| 8,606,792 B1 | 12/2013 | Jackson et al. | |
| 8,676,736 B2 | 3/2014 | Pilaszy et al. | |
| 8,683,374 B2 | 3/2014 | Vaughan et al. | |
| 8,712,937 B1 | 4/2014 | Bacus et al. | |
| 8,751,507 B2 | 6/2014 | Kim et al. | |
| 8,869,042 B2 | 10/2014 | Kast | |
| 8,886,797 B2 | 11/2014 | Gannu et al. | |
| 8,893,042 B2 | 11/2014 | Laurie et al. | |
| 8,893,043 B2 | 11/2014 | Dodson et al. | |
| 8,903,834 B2 | 12/2014 | Ciancutti et al. | |
| 8,910,070 B2 | 12/2014 | Goodger et al. | |
| 8,914,399 B1 | 12/2014 | Paleja et al. | |
| 8,972,865 B2 | 3/2015 | Hansen et al. | |
| 8,983,888 B2 | 3/2015 | Nice et al. | |
| 8,996,530 B2 | 3/2015 | Luvogt et al. | |
| 9,053,416 B1 | 6/2015 | De Leo et al. | |
| 9,098,248 B2 | 8/2015 | Suzuki et al. | |
| 9,122,989 B1 | 9/2015 | Morris et al. | |
| 9,348,898 B2 | 5/2016 | Nice et al. | |
| 9,405,741 B1 | 8/2016 | Schaaf et al. | |
| 9,473,803 B2 | 10/2016 | Wang | |
| 9,569,785 B2 | 2/2017 | Alon et al. | |
| 9,660,947 B1 | 5/2017 | Hart | |
| 9,785,883 B2 | 10/2017 | Luvogt et al. | |
| 9,836,533 B1 | 12/2017 | Levi et al. | |
| 9,836,765 B2 | 12/2017 | Hariri et al. | |
| 9,900,659 B1 | 2/2018 | Norum et al. | |
| 2002/0054164 A1 | 5/2002 | Uemura | |
| 2002/0198882 A1 | 12/2002 | Linden et al. | |
| 2004/0158497 A1 | 8/2004 | Brand | |
| 2004/0260621 A1 | 12/2004 | Foster et al. | |
| 2005/0076365 A1 | 4/2005 | Popov et al. | |
| 2005/0097190 A1 | 5/2005 | Abdelhak | |
| 2006/0031114 A1 | 2/2006 | Zommers | |
| 2006/0041548 A1 | 2/2006 | Parsons et al. | |
| 2006/0293065 A1 | 12/2006 | Chew et al. | |
| 2008/0222132 A1 | 9/2008 | Pan et al. | |
| 2008/0250039 A1 | 10/2008 | Franks et al. | |
| 2008/0256017 A1 | 10/2008 | Murakami | |
| 2008/0266289 A1 | 10/2008 | Park | |
| 2008/0294617 A1 | 11/2008 | Chakrabarti et al. | |
| 2009/0006371 A1 | 1/2009 | Denoue | |
| 2009/0006373 A1 | 1/2009 | Chakrabarti et al. | |
| 2009/0055385 A1 | 2/2009 | Jeon et al. | |
| 2009/0150935 A1 | 6/2009 | Peters et al. | |
| 2009/0163183 A1 | 6/2009 | O'Donoghue et al. | |
| 2009/0249217 A1 | 10/2009 | Narayanaswami | |
| 2009/0276368 A1 | 11/2009 | Martin et al. | |
| 2009/0327941 A1 | 12/2009 | Fong et al. | |
| 2010/0050067 A1 | 2/2010 | Curwen et al. | |
| 2010/0070454 A1 | 3/2010 | Masuda et al. | |
| 2010/0070928 A1 | 3/2010 | Goodger et al. | |
| 2010/0131844 A1 | 5/2010 | Wohlert | |
| 2010/0175018 A1 | 7/2010 | Petschnigg et al. | |
| 2010/0205542 A1 | 8/2010 | Walman | |
| 2010/0251304 A1 | 9/2010 | Donoghue et al. | |
| 2010/0312650 A1 | 12/2010 | Pinckney et al. | |
| 2010/0312724 A1 | 12/2010 | Pinckney et al. | |
| 2011/0029636 A1 | 2/2011 | Smyth et al. | |
| 2011/0035388 A1 | 2/2011 | Im et al. | |
| 2011/0047136 A1 | 2/2011 | Dehn | |
| 2011/0047491 A1* | 2/2011 | Hwang | G06F 3/0488 |
| | | | 715/765 |
| 2011/0066497 A1* | 3/2011 | Gopinath | G06Q 30/02 |
| | | | 705/14.53 |
| 2011/0072011 A1 | 3/2011 | Qiao | |
| 2011/0107223 A1 | 5/2011 | Tilton et al. | |
| 2011/0112981 A1 | 5/2011 | Park et al. | |
| 2011/0179081 A1 | 7/2011 | Ovsjanikov et al. | |
| 2011/0208732 A1 | 8/2011 | Melton et al. | |
| 2011/0213761 A1 | 9/2011 | Song et al. | |
| 2011/0246406 A1 | 10/2011 | Lahav et al. | |
| 2011/0252050 A1 | 10/2011 | Palleti et al. | |
| 2011/0258185 A1 | 10/2011 | Acharya et al. | |
| 2011/0302117 A1 | 12/2011 | Pinckney et al. | |
| 2011/0302158 A1* | 12/2011 | Sanders | G06F 16/9535 |
| | | | 707/723 |
| 2011/0320450 A1 | 12/2011 | Liu et al. | |
| 2012/0030159 A1 | 2/2012 | Pilaszy et al. | |
| 2012/0054794 A1* | 3/2012 | Kim | G06F 3/0346 |
| | | | 725/38 |
| 2012/0059707 A1 | 3/2012 | Goenka et al. | |
| 2012/0143871 A1 | 6/2012 | Liebald et al. | |
| 2012/0158685 A1* | 6/2012 | White | G06F 17/30867 |
| | | | 707/706 |
| 2012/0191776 A1 | 7/2012 | Ruffner et al. | |
| 2012/0209907 A1 | 8/2012 | Andrews et al. | |
| 2012/0254097 A1* | 10/2012 | Flinn | G06N 7/02 |
| | | | 706/52 |
| 2012/0304073 A1* | 11/2012 | Mandic | G06F 16/954 |
| | | | 715/745 |
| 2012/0317104 A1 | 12/2012 | Radlinski et al. | |
| 2013/0009990 A1* | 1/2013 | Hsu | G06F 3/0488 |
| | | | 345/629 |
| 2013/0024471 A1 | 1/2013 | Mitrovic | |
| 2013/0031090 A1 | 1/2013 | Posse et al. | |
| 2013/0041896 A1 | 2/2013 | Ghani et al. | |
| 2013/0046772 A1 | 2/2013 | Gu et al. | |
| 2013/0047112 A1 | 2/2013 | Waeller | |
| 2013/0073988 A1 | 3/2013 | Groten et al. | |
| 2013/0111395 A1* | 5/2013 | Ying | G06F 3/0483 |
| | | | 715/783 |
| 2013/0132515 A1 | 5/2013 | Mostafa et al. | |
| 2013/0158693 A1 | 6/2013 | Beckmann et al. | |
| 2013/0159243 A1 | 6/2013 | Wei et al. | |
| 2013/0194308 A1 | 8/2013 | Privault et al. | |
| 2013/0204737 A1 | 8/2013 | Agarwal et al. | |
| 2013/0227054 A1 | 8/2013 | Zhang et al. | |
| 2013/0262478 A1 | 10/2013 | Kemp et al. | |
| 2013/0290110 A1 | 10/2013 | Luvogt et al. | |
| 2013/0290905 A1 | 10/2013 | Luvogt et al. | |
| 2013/0297698 A1 | 11/2013 | Odero et al. | |
| 2013/0311408 A1 | 11/2013 | Bagga et al. | |
| 2013/0346182 A1 | 12/2013 | Cheng et al. | |
| 2013/0346234 A1 | 12/2013 | Hendrick et al. | |
| 2014/0006399 A1 | 1/2014 | Vasudevan et al. | |
| 2014/0025532 A1 | 1/2014 | Huang et al. | |
| 2014/0025609 A1 | 1/2014 | Coster et al. | |
| 2014/0032678 A1 | 1/2014 | Koukoumidis et al. | |
| 2014/0040776 A1* | 2/2014 | Dann | G06F 3/0485 |
| | | | 715/753 |
| 2014/0074856 A1 | 3/2014 | Rao et al. | |

(56) References Cited

U.S. PATENT DOCUMENTS

| | | |
|---|---|---|
| 2014/0095967 A1 | 4/2014 | Cheng et al. |
| 2014/0101142 A1 | 4/2014 | Gomez et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1* | 7/2014 | Joo .................. G06F 3/0481 715/784 |
| 2014/0250390 A1 | 9/2014 | Holmes et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2015/0006286 A1 | 1/2015 | Liu et al. |
| 2015/0052003 A1 | 2/2015 | Tang et al. |
| 2015/0066643 A1* | 3/2015 | Choi .................. G06Q 30/0255 705/14.53 |
| 2015/0088921 A1* | 3/2015 | Somaiya ............... G06F 16/248 707/767 |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0178282 A1 | 6/2015 | Gorur et al. |
| 2015/0189070 A1 | 7/2015 | Baker |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1* | 11/2015 | Cho .................. G01C 21/3484 701/428 |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0370798 A1 | 12/2015 | Ju et al. |
| 2015/0378707 A1* | 12/2015 | Park .................. G06F 3/0486 717/174 |
| 2015/0379146 A1 | 12/2015 | Tonse et al. |
| 2016/0004394 A1 | 1/2016 | MacAdaan et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0196244 A1 | 7/2016 | Greenberg et al. |
| 2016/0275804 A1 | 9/2016 | Koppel et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |
| 2017/0132230 A1 | 5/2017 | Muralidhar et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0014038 A1 | 1/2018 | Lamburt et al. |
| 2018/0075137 A1 | 3/2018 | Lifar |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104359473 A | 4/2015 |
| CN | 104636371 A | 5/2015 |
| CN | 303532062 S | 12/2015 |
| CN | 105893398 A | 8/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| EP | 3032780 | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2419858 C2 | 5/2011 |
| RU | 2451986 C2 | 11/2011 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |

OTHER PUBLICATIONS

IBM DB2, Jim Bainbridge, Apr. 13, 2017.*
European Examination Report with regard to the counterpart patent application No. EP 16190999.9 dated Jun. 29, 2018.
English Abstract of CN303532062 retrieved on Google Translate dated Apr. 4, 2017.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
English Abstract for CN104317835 retrieved on Espacenet on May 7, 2018.
English Abstract for CN105893398 retrieved on Espacenet on May 7, 2018.

(56) References Cited

OTHER PUBLICATIONS

English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
Youtube Account: RnStore, "Zmags Demo", (May 19, 2011), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, dated Feb. 16, 2017, Herry, Tzvetanka.
European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.nethix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), Caise, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Russian Search Report from Ru patent application No. 2015141108 dated Sep. 7, 2016.
U.S. Appl. No. 29/590,781, filed Jan. 13, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Office Action with regard to the counterpart U.S. Appl. No. 15/606,326 dated Dec. 19, 2018.
Office Action with regard to the counterpart U.S. Appl. No. 15/262,332 dated Dec. 27, 2018.
English Abstract for CN103473354 retrieved on Espacenet on Jan. 4, 2019.
Office Action with regard to the counterpart U.S. Appl. No. 15/263,493 dated Nov. 29, 2018.
Notice of Allowance with regard to the counterpart U.S. Appl. No. 15/262,332 dated Mar. 18, 2019.
English Abstract for JP2009015834 retrieved on Espacenet on Mar. 21, 2019.
Office Action with regard to the counterpart U.S. Appl. No. 15/262,318 dated Apr. 1, 2019.
Office Action with regard to the counterpart U.S. Appl. No. 15/263,493 dated May 9, 2019.
Martin Beck, "Facebook Now Asks Why You're Hiding That Ad, to Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.

\* cited by examiner

COMPUTER-IMPLEMENTED METHOD OF GENERATING A CONTENT RECOMMENDATION INTERFACE

CROSS-REFERENCE

The present application claims priority to Russian Patent Application No. 2016118519, filed May 12, 2016, entitled "A COMPUTER-IMPLEMENTED METHOD OF GENERATING A CONTENT RECOMMENDATION INTERFACE", the entirety of which is incorporated herein by reference.

FIELD

The present technology relates to recommendation systems, and more particularly, to a computer-implemented method of generating a content recommendation for a user of an electronic device.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks) via a browser application, to retrieve, present and traverse information across the World Wide Web.

Browser applications, such as Google™ Chrome™, Microsoft™ Edge™, Mozilla™ Firefox™, Apple™ Safari™ and Opera™, usually includes interface elements such as an address bar to input a Uniform Resource Identifier (URI) of the desired resource, a viewport to display the resource, a refresh button to reload the current resource, back and forward buttons to go back to the previous and respective resources, a search bar to input terms into a search engine, a home button to return to the user's homepage, among others.

The volume of available information through various Internet resources has grown exponentially in the past couple of years. Several solutions have been developed in order to allow a typical user to find the information that the user is looking for. One example of such a solution is a search engine that can be accessed by the browser application. Examples of the search engines include Google™ search engine, Yandex™ search engine, Yahoo!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the tanked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

As a person skilled in the art of the present technology may appreciate, a quality of a user experience may not be solely defined by how relevant information content may be to a given user. Accordingly, how the information content is presented to a user may also be an important aspect of the user experience. In some instances, how the information content is presented to a user may be appreciated independently of how the information has been generated, selected and/or recommended. Multiple approaches as to how the information content is presented to a user via an electronic device have been developed. As a quantity of information content that can be presented to the user is virtually limitless attempts have been made to provide users with more intuitive navigational access to the information content, as an example, via specialized recommendation websites and software applications.

Moreover, the proliferation of devices with different screen sizes combined with the proliferation of multiple applications to access content, browse content, search content, all offering different interfaces and requiring switching between different applications may not only require more time, gestures, put a strain on the battery and require more processing power, but may also impoverish user experience.

US 2014095967 A1 discloses a method and apparatus for displaying information. When a terminal receives a request for starting a browser, the terminal obtains quick links and web applications that are cached in local database of the terminal and displays the obtained quick links by combinations of webpage icons and webpage titles in a middle screen display interface of a start page of the browser for the requester. When receiving a request for switching display interfaces of the start page of the browser, the terminal displays a search box in the start page of the browser or the obtained web applications by combinations of application icons and application titles in the start page of the browser.

SUMMARY

Developers of the present technology have appreciated certain technical drawbacks associated with the existing systems and methods of generating a content recommendation interface for a user of an electronic device. It is an object of the present technology to ameliorate at least some of the inconveniences present in the prior art, in particular by limiting a number of interactions required by a user to in a way that (1) limits a number of gestures a user has to physically conduct with an electronic device; and (2) limits disrupting a navigation experience of the user with browser content; and (3) aggregates searching, links and recommended content in a single browsing application interface.

The present technology thereby results, amongst other benefits, in an improved navigation experience by limiting a number of interactions required by the user to interact with a browser application, for example, but without being limited to, accessing network resources, searching for network resources and accessing recommended content. The limited number of interactions may result in (1) reducing a number of gestures a user has to physically conduct with an electronic device; (2) reducing disruption of a navigation experience of the user while interacting with the browser application; and/or (3) more intuitive interaction of the user with the browser application and the recommended content.

In one aspect, implementations of the present technology provide a computer-implemented method of generating a content recommendation interface for a user of an electronic device, the method executable by the electronic device, the electronic device having a processor and a user-interface device coupled to the processor, the processor being configured to execute a browser application, the electronic device further comprising a network interface for connecting to a recommendation server via a communication network, the method comprising: receiving, via the user-interface device, a first user-indication for activating the browser application; responsive to the first user-indication, generating on the user-interface device a first graphical user interface (GUI) of the browsing application, the first GUI comprising three simultaneously presented visual-interface elements disposed within the first GUI: a first interface element comprising an omnibox, the omnibox configured to receive at least one of a network address and a search query, the first interface element being located substantially in a center of the first GUI; a second interface element comprising at least one icon representing user-selected content, each of the at least one icons being linked to an associated network resource accessible via the communication network, the second interface element being spaced a first distance away, in a first direction, from the first interface element; a third interface element comprising at least one recommendation icon, the first recommendation icon associated with recommended content selected, by the recommendation server, from a plurality of potentially recommendable content items, the third interface element being spaced a second distance away, in a second direction, from the first interface element, the second direction being opposite to the first direction; receiving, via the user-interface device, an indication of a first user-interaction with the first GUI; responsive to determining the first user-interaction being a user-gesture associated with the first direction, generating a second GUI, to be displayed in place of the first GUI, the second GUI including: a portion of the first interface element located at an extremity of the second GUI located in the first direction; and the second interface element located such that the first distance is collapsed; and not including the third interface element; responsive to determining the first user-interaction being the user-gesture associated with the second direction, generating the second GUI, to be displayed in place of the first GUI, the second GUI including: the third interface element, such that at least one recommendation icon includes a first recommendation icon and at least a second recommendation icon, the first recommendation icon to be displayed in its entirety and the at least the second recommendation icon to be at least partially displayed; and not including the first interface element and the second interface element.

In some implementations, the method may further comprise determining a proportion of the first GUI dedicated to the second interface element and the third interface element; and wherein the determining is based on a parameter of the user-interface device.

In some implementations, the method may further comprise determining the first distance and the second distance; and wherein the determining is based on a parameter of the user-interface device.

In some implementations, the method may further comprise receiving, from the recommendation server, an indication of the recommended content selected, by the recommendation server, from the plurality of potentially recommendable content items, the selection having been executed specifically for the user.

In some implementations, the recommendation icon is linked to an associated recommended content item available from an associated network resource accessible via the communication network.

In some implementations, responsive to the first user-interaction being a touch user-gesture on the recommendation icon of the third interface element, accessing the associated network resource linked to the recommendation icon by generating the third GUI, the third GUI being part of a new window of the browser application.

In some implementations, the method may further comprise, responsive to the first user-interaction being a touch user-gesture on the omnibox, generating the second GUI, the second GUI including: the first interface element being located substantially in a center of the second GUI; the second interface element; and an application keyboard for inputting a text in the omnibox.

In some implementations, responsive to the first user-interaction being a touch user-gesture on the icon of the second interface element, accessing the associated network resource linked to the icon by generating a third GUI, the third GUI being part of a new window of the browser application.

In some implementations, the method may further comprise displaying an edit screen of the second interface element on the second GUI responsive to a long press user-gesture on the second interface element.

In some implementations, the method may further comprise executing an animated transition between the first GUI and the second GUI responsive to the user-gesture.

In some implementations, the method may further comprise determining a parameter of the animated transition, the parameter including at least a speed of transition, the determining comprising: receiving a first location and a first time of the user-gesture; receiving a second location and a second time of the user-gesture; determining the speed of transition by computing the difference between the second location and the first location and the difference between the second time and the first time of the user-gesture.

In some implementations, the determining the first user-interaction being the user-gesture associated with the first direction comprises: receiving a first location of the user gesture; receiving a second location of the user gesture; and computing a difference between the second location and the first location of the user gesture.

In some implementations, the determining the first user-interaction being the user-gesture associated with the second direction comprises: receiving a first location of the user gesture; receiving a second location of the user gesture; and computing the difference between the second location and the first location of the user gesture.

In some implementations, responsive to receiving an indication of the user rotating the electronic device to a second orientation, displaying a subset of the first GUI as the first GUI.

In some implementations, responsive to receiving an indication of the user rotating the electronic device to the second orientation, displaying a superset of the first GUI as the first GUI.

In some implementations, the method may further comprise receiving, via the user-interface device, an indication of a second user-interaction with the second GUI, the second GUI including the third interface element and not including the first interface element and the second interface; responsive to determining the second user-interaction with the second GUI being the user-gesture associated with the second direction, generating on the second interface element, a third recommendation icon and at least a fourth recommendation icon, the third recommendation icon to be displayed in its entirety and the at least the fourth recommendation icon to be at least partially displayed.

In some implementations, the third recommendation icon is the second recommendation icon.

In another aspect, there is provided a system for generating a content recommendation interface for a user of an electronic device, the method executable by the electronic device, the electronic device having at least one processor and a user-interface device coupled to the processor, the processor being configured to execute a browser application, the electronic device further comprising a network interface for connecting to a recommendation server via a communication network, the processor structured and configured to: receive, via the user-interface device, a first user-indication for activating the browser application; responsive to the first user-indication, generate on the user-interface device a first graphical user interface (GUI) of the browsing application, the first GUI comprising three simultaneously presented visual-interface elements disposed within the first GUI: a first interface element comprising an omnibox, the omnibox configured to receive at least one of a network address and a search query, the first interface element being located substantially in a center of the first GUI; a second interface element comprising at least one icon representing user-selected content, each of the at least one icons being linked to an associated network resource accessible via the communication network, the second interface element being spaced a first distance away, in a first direction, from the first interface element; a third interface element comprising at least one recommendation icon, the first recommendation icon associated with recommended content selected, by the recommendation server, from a plurality of potentially recommendable content items, the third interface element being spaced a second distance away, in a second direction, from the first interface, the second direction being opposite to the first direction; receive, via the user-interface device, an indication of a first user-interaction with the first GUI; responsive to determining the first user-interaction being a user-gesture associated with the first direction, generate a second GUI, to be displayed in place of the first GUI, the second GUI including a portion of the first interface element located at an extremity of the second GUI located in the first direction; and the second interface element located such that the first distance is collapsed; and not including the third interface element; responsive to determining the first user-interaction being the user-gesture associated with the second direction, generate the second GUI, to be displayed in place of the first GUI, the second GUI including: the third interface element, such that at least one recommendation icon includes a first recommendation icon and at least a second recommendation icon, the first recommendation icon to be displayed in its entirety and the at least the second recommendation icon to be at least partially displayed; and not including the first interface element and the second interface element.

In other aspects, various implementations of the present technology provide a non-transitory computer-readable medium storing program instructions for interacting with a content element of a content stream, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for interacting with a browser application, the program instructions being executable by one or more processors of the computer-based system to carry out one or more of the above-recited methods.

In the context of the present specification, unless expressly provided otherwise, a "computer system", an "electronic device", a "mobile device", "a device", a "server", a "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a graphical user interface (GUI) may refer to an interface displayed on at least a portion of a screen of an electronic device allowing a user to interact with the electronic device through graphical icons and visual indicators. A user may interact with the graphical interface through direct manipulations of the graphical elements of the GUI. A graphical user interface may comprise at least one interface element, and an interaction with the graphical user interface may generate or make appear other graphical user interfaces.

In the context of the present specification an icon refers to an element of a graphical user interface, and may include images, videos, animation, text, widgets and any other content part of the graphical user interface.

In the context of the present specification, a content recommendation may refer to any algorithm able to recommend content to a user via a recommendation server. The recommendation server may use machine leanings algorithms such as artificial neural networks, bayesian statistics, gaussian process regression, decision trees and the like to recommend content to the user.

In the context of the present specification, a browser application may refer to a software application implemented on a mobile device used for retrieving, presenting and traversing information resources such as web pages, images, videos and other content on the World Wide Web. The browser application may refer to a stand alone application (app) or may be part of another application allowing viewing web content on the device. The browser application may comprise a user interface, a layout engine, a rendering engine, a JavaScript interpreter, a UI backend, a networking component and a data persistence component.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, an interface element located "substantially in a center" may refer to an interface element part of a GUI located in a middle region or close to a middle region within the GUI displayed by a browser application. An interface element located at an "extremity" may refer to an interface element part of GUI located at an edge region or close to an edge region within the GUI displayed by a browser application. Interface elements may be located substantially in a center or at an extremity of the GUI of a browser application may not be necessarily be located as such relative to the displayable area of the screen of the device, as a device could run one or more programs simultaneously splitting the display screen in one or more areas, and a browser may only occupy a subset of the displayable area of the screen of the device. An interface element spaced a first distance away, in a first direction from another interface element may refer to an interface element that is at a certain distance in a certain direction on a certain axis, such as, but not limited to, the upward (bottom to top) or downward (top to bottom) direction on the vertical axis. A user-gesture associated with the first direction may refer to a user-gesture, such as a swipe movement, made to interact with the interface element, the swipe movement being along the same axis as the interface element, the swipe movement can be in the same direction (i.e. the first direction) or an opposite direction (i.e. the second direction) and will depend on how the device or the software on the device is implemented.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
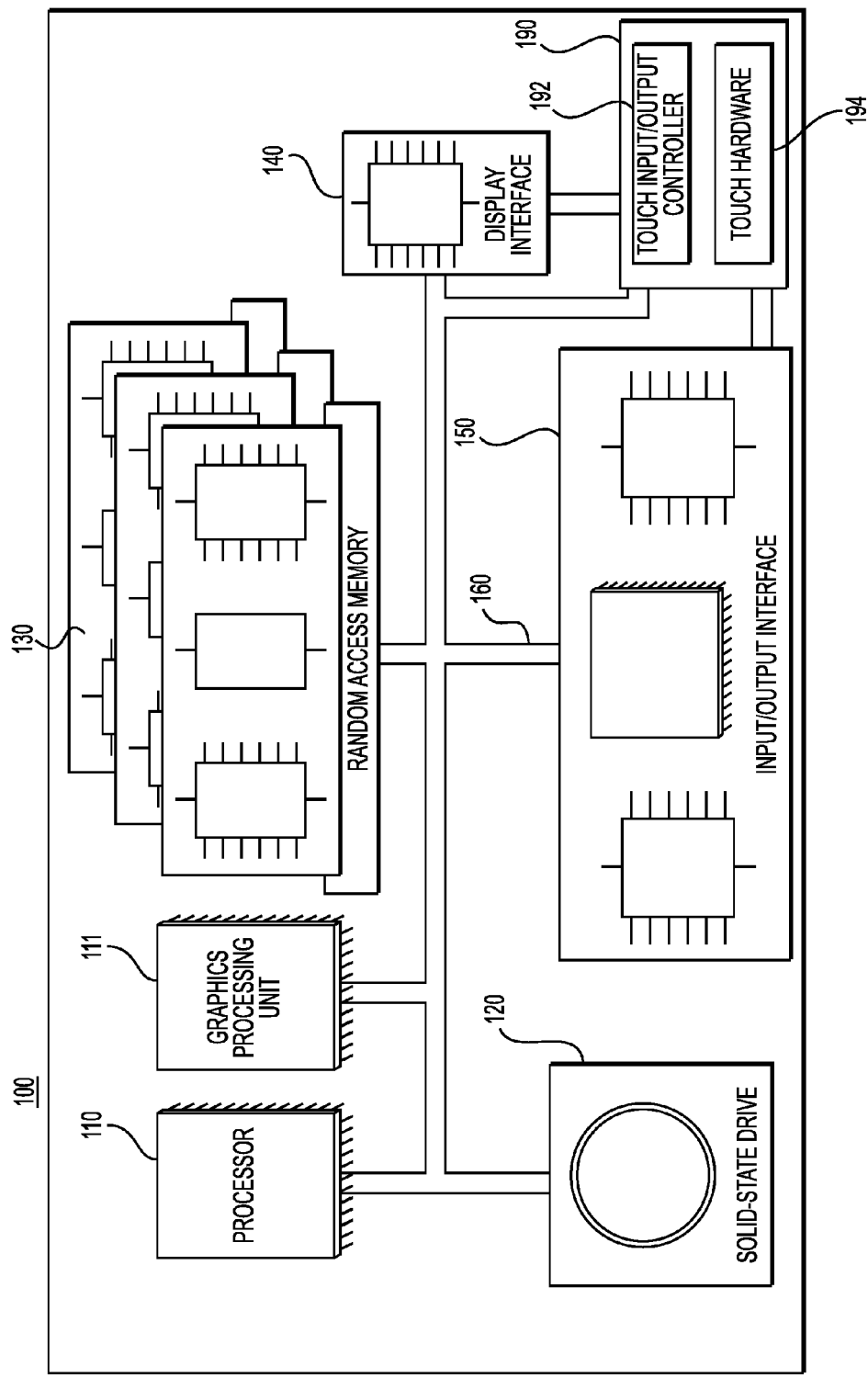
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 there is shown a computer system 100 suitable for use with some implementations of the present technology. In some embodiments, the computer system 100 is implemented as an electronic device 210 (shown at FIG. 2) in the form of a mobile device. The computer system 100 comprises various hardware components including one or more single or multi-core processors collectively represented by processor 110, a graphics processing unit (GPU) 111, a solid-state drive 120, a random access memory 130, a display interface 140, and an input/output interface 150. The computer system 100 may be a smartphone such as, but not limited to, an iPhone™ from Apple or Galaxy™ from Samsung. The computer system 100 may also be a tablet, such as, but not limited to, an iPad™ from Apple or Galaxy Tab™ from Samsung. Generally speaking, the computer system 100 may be, amongst other things, be an "electronic device", a "mobile device", "a device", are any hardware and/or software appropriate to the relevant task at hand. As a person in the art of the present technology may appreciate, multiple variations as to how the computer system 100 is implemented may be envisioned without departing from the scope of the present technology.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled. A display interface 140 may be coupled to a display (not shown) via a cable or a bus. The display may also equally be referred to as a screen.

The input/output interface 150 may be coupled to a touchscreen 190 and/or to the one or more internal and/or external buses 160. The touchscreen 190 may be part of the display. In some embodiments, the touchscreen 190 is the display. The computer 100 with the touchscreen 190 may be referred to as a user-interface device. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown) allowing the user to interact with the computer system 100 in addition of the touchscreen 190.

According to implementations of the present technology, the solid-state drive 120 stores program instructions suitable for being loaded into the random access memory 130 and executed by the processor 110 and/or the GPU 111 for allowing a user to interact with a content element of a content stream by executing a content stream display application. In some embodiments, the content stream display application may equally be referred to as a recommendation application. For example, the program instructions may be part of a library or an application.

Generally, but not limitatively, the computer system 100 may execute an operating system, such as Apple iOS™ 9 for Apple iPhone™ devices, or Android Marshmallow™ for Samsung™ Galaxy™ devices. Moreover, a browser application 215 (depicted in FIG. 1) may be implemented on top of the operating system according to programming standards and languages such as, but not limited to Swift or Objective-C for iOS devices or Android Java for devices running Android OS.

Generally speaking, the purpose of the browser application 215 is to enable a user (such as a user 170 depicted in FIG. 2) to interact with (or otherwise visualize) a content stored in the memory (such as random access memory 130) of the computer system 100, as will be described in greater detail herein below.

How the browser application 215 is implemented is not particularly limited. The browser application 215 can be an application downloaded from a so-called app store, such as, but not limited to, an App Store™ from Apple and/or Google Play™ Store from Google and installed/executed on the computer system 100. It should be expressly understood that the browser application 215 can be accessed using any other suitable means.

Figure 2:
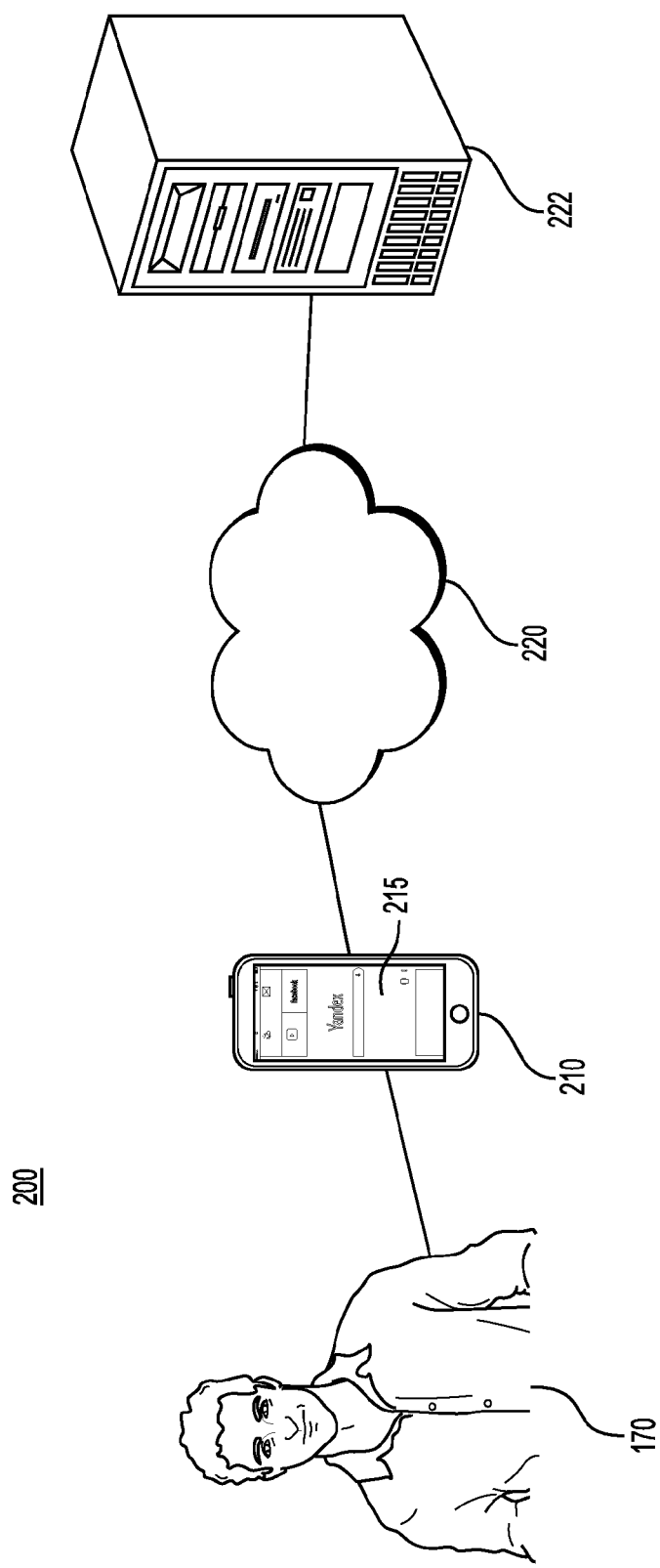
FIG. 2 is a diagram of a networked computing environment in accordance with an embodiment of the present technology.

Turning now to FIG. 2, there is shown a networked computing environment 200 suitable for use with some implementations of the present technology. The networked computing environment 200 comprises an electronic device 210 running the browser application 215. The electronic device 210 can be associated with a user 170. In some embodiments, the electronic device 210 is implemented so as to include at least some of the components of the computer system 100. Throughout the present document, the electronic device 210 may equally be referred to as the computer system 100 and vice-versa. The networked computing environment 200 may comprise a server 222 in communication with the electronic device 210 via a communication network 220. The networked computing environment 200 may contain more servers and/or more electronic devices without departing from the scope of the present technology. The number of servers and the type of architecture is therefore not limitative to the scope of the present technology.

In one embodiment, a communication channel (not depicted) between the electronic device 210 and the server 222 may be established to allow data exchange. Such data exchange may occur on a continuous basis or, alternatively, upon occurrence of certain events. For examples, in the context of (i) generating content recommendations to be presented to the user 170; and/or (ii) responding to user interactions with various interface elements. In some embodiments, the server 222 may generate data, such as, but not limited to, data allowing recommended content elements to be presented to the user 170. The data generated by the server 222 may be transmitted to the electronic device 210. Once received, the data may be processed by the electronic device 210 so as to create a recommended content stream to be presented on the touchscreen 190 of the electronic device 210. In some embodiments, the user 170, through the electronic device 210, may interact with the one or more recommended content elements (or other elements of the browser application 215 and/or cause an action in connection with one or more recommended content elements of the content stream. As a result, the electronic device 210 may transmit data relating to such action to the server 222. The server 222, upon receiving the data from the electronic device 210 may undertake additional actions, such as a storing of the received data and/or providing new recommended content elements to the user 170 and/or provide the user 170 with suggested resource links in response to search queries or usage history.

The server 222 may be implemented as a conventional computer server and may comprise some or all of the features of the computer system 100 depicted at FIG. 1. In an example of an embodiment of the present technology, the server 222 can be implemented as a Dell™ PowerEdge™ Server running the Microsoft™ Windows Server™ operating system. Needless to say, the server 222 can be implemented in any other suitable hardware and/or software and/or firmware or a combination thereof. In the depicted non-limiting embodiment of present technology, the server 222 is a single server. In alternative non-limiting embodiments of the present technology, the functionality of the server 222 may be distributed and may be implemented via multiple servers.

The implementation of the server 222 is well known to a person skilled in the art of the present technology. However, briefly speaking, the server 222 comprises a communication interface (not depicted) structured and configured to communicate with various entities (such as the electronic device 210, for example and other electronic devices potentially coupled to the network) via the network. The server 222 further comprises at least one computer processor (e.g., a processor 110 of the server 222) operationally connected with the communication interface and structured and configured to execute various processes.

Merely as an example and not as a limitation, in those embodiments of the present technology where the electronic device 210 is implemented as a wireless communication device (such as a smartphone or a tablet), the communication link can be implemented as a wireless communication link (such as but not limited to, a 3G communication network link, a 4G communication network link, Wireless Fidelity, or WiFi® for short, Bluetooth® and the like). As a person skilled in the art of the present technology may appreciate, multiple variations may be envisioned without departing from the scope of the present technology.

Figure 3:
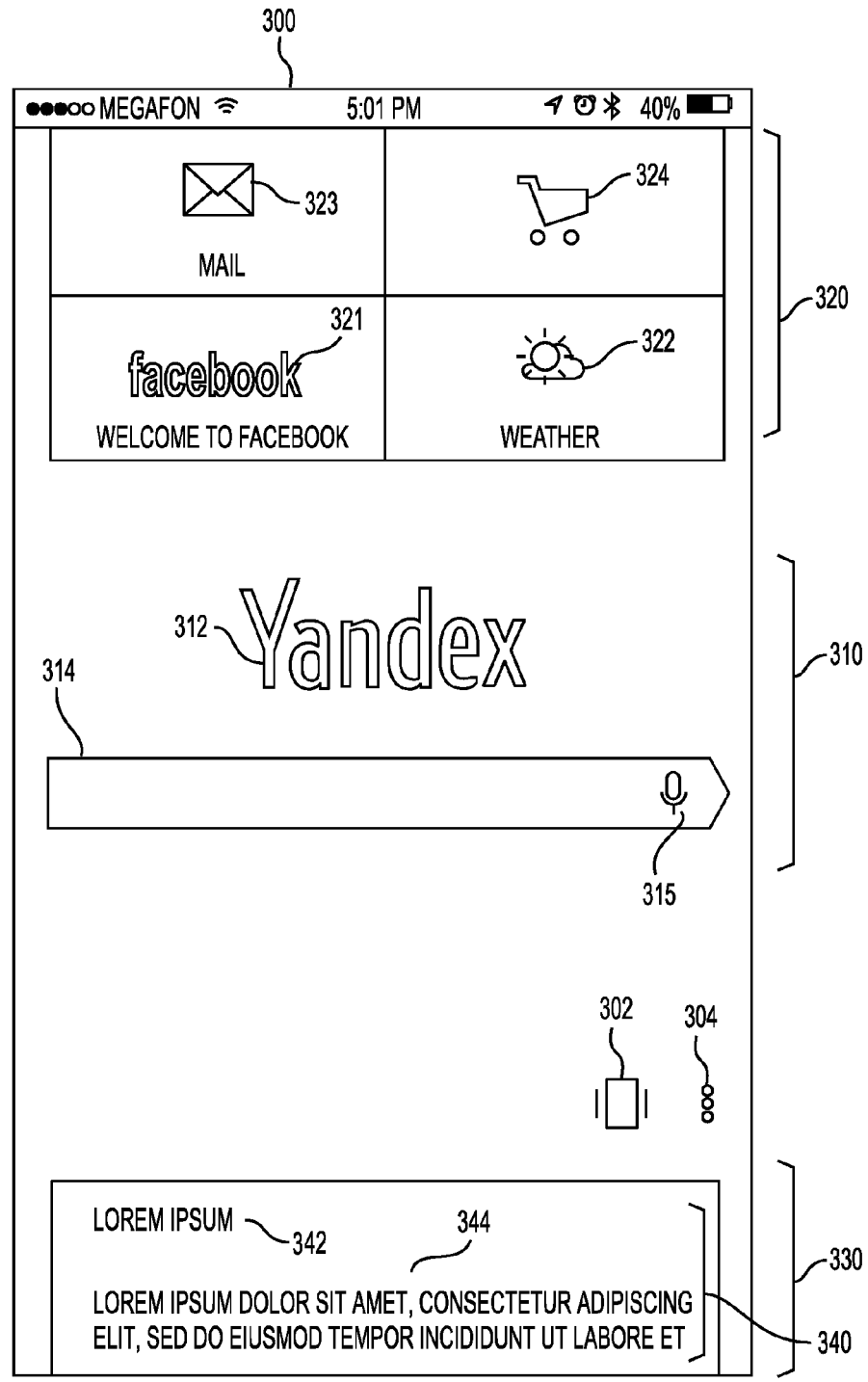
FIG. 3 is a diagram of a first graphical user interface (GUI) displayed on the computer system of FIG. 1 via a browser application in accordance with an embodiment of the present technology.

Reference is now made to FIG. 3 wherein a first graphical user interface (GUI) 300 is displayed on the electronic device 210 for example via the browser application 215 running on the electronic device 210. The first GUI 300 may be directly presented to the user 170 when the user 170 activates the browser application 215. In some embodiments, the first GUI 300 may be presented to the user 170 after receiving an indication, from a button on the browser application 215 or from another application (not depicted). The first GUI 300 may generally comprise three visual-interface elements: at least a portion of a first interface element 310 located in the middle, at least a portion of a second interface element 320 located at the top, and at least a portion of the third interface element 330 located at the bottom. The first GUI 300 may further comprise a first button 302, a second button 304 and a background 306.

The first interface element 310 may comprise a logo 312, in this example the Yandex™ logo; an omnibox 314 and a microphone icon 315 that forms part of the omnibox 314. The logo 312 may be a static image, a dynamic image or a video. The logo 312 may be an interactive element associated with an action; in this example the logo 312 is associated with a hyperlink directed to the Yandex™ search engine website. In some embodiments, the logo 312 may be associated with other actions of the browser application 215, or may not be associated with any action. In other embodiments, there may be no logo 312. The omnibox 314 may be directly linked to a search engine, such as the Yandex™ search engine, and may be configured to allow the user 170 to interact with the omnibox to input a search query and/or a network address, such as a Uniform Resource Locator (URL) of a website to access. In the depicted embodiment, the omnibox 314 is a combination of an address bar of the browser application 215 and a search engine input field. The microphone icon 315 may be used for entering a voice input via the electronic device 210, which will be explained in detail below.

The part of the second interface element 320 displayed in the first GUI 300 may comprise a first icon 321, a second icon 322, a third icon 323 and a fourth icon 324. Each one of the first icon 321, the second icon 322, the third icon 323 and the fourth icon 324 may comprise only a graphical representation, only a textual representation or a combination of graphical and textual representation of the associated network resource. In some embodiments, each one of the first icon 321, the second icon 322, the third icon 323 and the fourth icon 324 may be a static graphical representation, such as an image, or a dynamic graphical representation, such as an animated image. In the example of FIG. 3, the first icon 321 may be the Facebook™ logo, the second icon 322 be a cloud icon with the text "weather" written below, the third icon 323 may be an e-mail icon with the text "e-mail" written below and the fourth icon 324 may be a shopping cart icon with no text written below. Each one of the first icon 321, the second icon 322, the third icon 323 and the fourth icon 324 may be linked to a respective network resource accessible via the communication network 220. In the example depicted herein, each one of the first icon 321, the second icon 322, the third icon 323 and the fourth icon 324 may include hyperlinks to different websites, the first icon 321 may link to www.facebook.com, the second 322 icon may link to pogoda.yandex.ru, the third icon 323 may link to mail.yandex.com and the fourth icon 324 may link to market.yandex.ru. In some embodiments, at least one of the first icon 321, the second icon 322, the third icon 323 and the fourth icon 324 may be an icon or button for interacting with the first interface element 310, such as, but not limited to, displaying user options or for navigating through the first GUI 300, the second GUI 400 and the second GUI 500.

In some embodiments of the present technology, the user 170 selects content of the links associated with the first icon 321, the second icon 322, the third icon 323 and the fourth icon 324 while consulting a network resource (not depicted). This selection can be executed by means of adding network resources to the first icon 321, the second icon 322, the third icon 323 and the fourth icon 324 directly while consulting a network resource in a window (not depicted) of the browser application 215.

The part of the third interface element 330 displayed on the first GUI 300 may comprise at least a portion of a first recommendation icon 340 that may be associated with a recommended content (not numbered). The recommended content associated with the first recommendation icon 340 may have been selected by a recommendation server, such as the server 222, from a plurality of potentially recommendable content items (not depicted). In the example depicted herein, the recommendation server is the Yandex™ Zen™ recommendation engine, and the first recommendation icon 340 is associated with a recommended content (not numbered) which may comprise a logo 342, the logo 342 coming from the source of the recommended content and a title of the recommended content 344.

In the example of FIG. 3, the second interface element 320 is located at the top, and the third interface element 330 is located at the bottom of the screen 190 of the electronic device 210 ("top" and "bottom" being in the orientation depicted in FIG. 3). However, in alternative embodiments, the second interface element 320 can be located at one of a left and a right of the first interface element 310 and the third interface element 330 can be located at the other one of the left and the right of the first interface element 310.

In some embodiments, even though the second interface element 320 and the third interface element 330 are not entirely visible to the user 170, the user 170 may still interact with the second interface element 320 and the third interface element 330 in a similar way that she/he would have had if the second interface element 320 and the third interface element 330 were displayed in their entirety.

In some embodiments, where the electronic device 210 implements the touchscreen 190, the user 170 may interact with the first GUI 300 by completing a swiping gesture on the screen of the electronic device 210. The swiping gesture may be oriented in a first direction, the downward direction, from top to bottom (with respect to a point of view of the user 170 holding the electronic device 210 vertically) so as to cause a first visual transition resulting in a second GUI 400 (shown in FIG. 4) comprising the second interface element 320 and/or the first interface element 310 to be displayed (partially or entirely) instead of the first GUI 300. In some embodiments, the first direction may be the upward direction, from bottom to top (with respect to a point of view of the user 170 holding the electronic device 210 vertically).

Conversely, a swiping gesture oriented in a second direction, the upward direction, from bottom to top causes a second visual transition resulting in a second GUI 500 (shown in FIG. 5) comprising the third interface element 330 to be displayed (partially or entirely) instead of the simultaneous display of the first interface element 310, the second interface element 320 and the third interface element 330 as on the first GUI 300. In some embodiments, the second direction may be the downward direction, from top to bottom (with respect to a point of view of the user 170 holding the electronic device 210 vertically).

As a result, in some embodiments, the user 170 may navigate through the first interface element 310, the second interface element 320 and the third interface element 330 forming the first GUI 300 by swiping in the first direction and/or the second direction, the first direction and the second direction being, in the embodiment illustrated at FIG. 3, along a vertical direction (e.g., upward direction and downward direction). Other variations as to how the user 170 may interact with the browser application (not depicted) may also be envisioned, such as, but not limited to swiping in other directions, providing feedback via the camera of the electronic device 210 without departing from the scope of the present technology.

Figure 4:
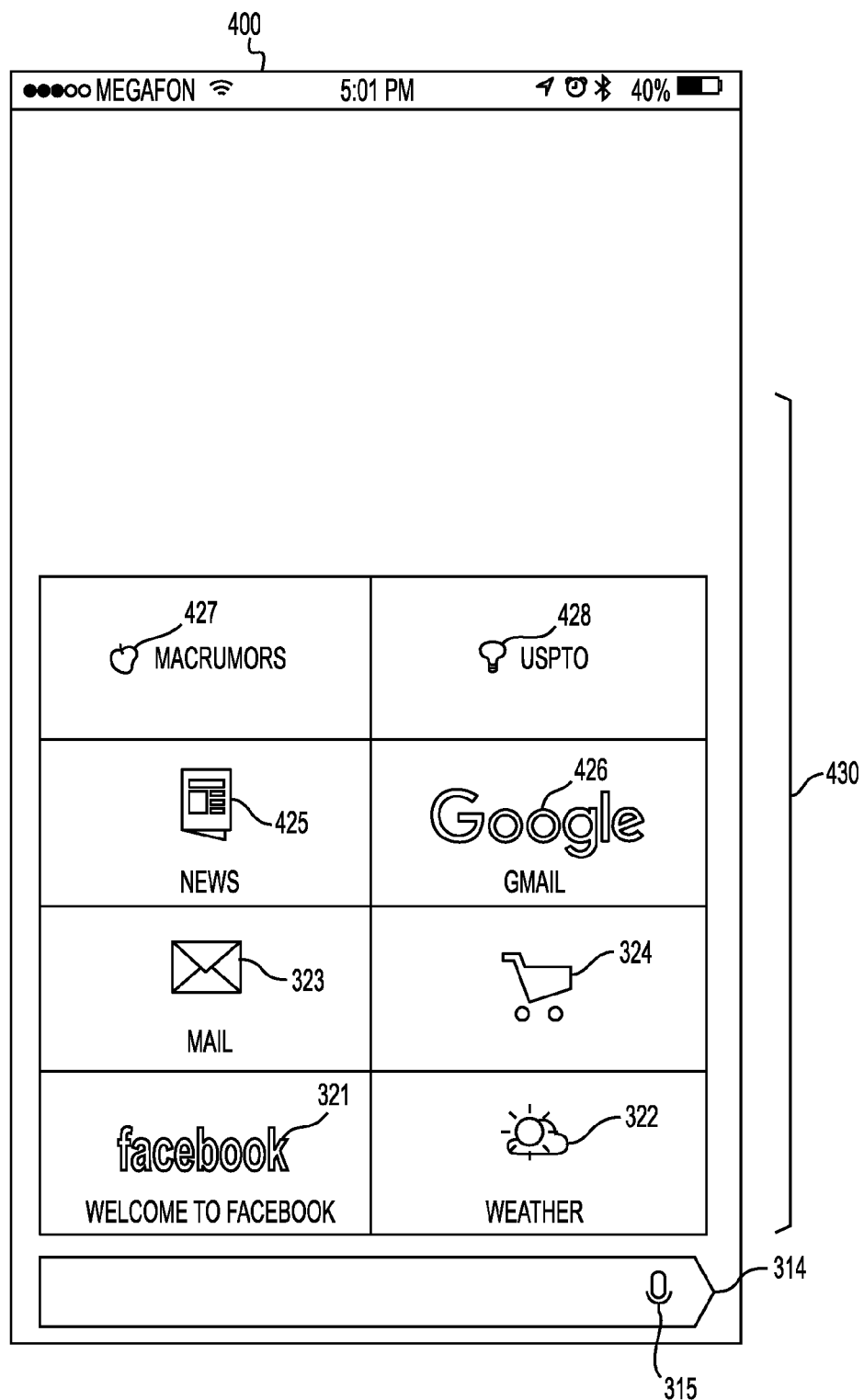
FIG. 4 is a diagram of a second graphical user interface (GUI) comprising a first interface element and a second interface element displayed on the computer system of FIG. 1 via a browser application in accordance with an embodiment of the present technology.

Turning now to FIG. 4, the second GUI 400 presented after the user 170 executed a user-gesture associated with the first direction, the downward direction, is depicted. The second GUI 400 may comprise the portion of the second interface element 320, as visible in the first GUI 300, and another portion of the second interface element 420, which was not visible in the first GUI 300. The part of the second interface element 320 and the other part of the second interface element 420 make up the entire second interface element 430. The second GUI 400 may have appeared after the user 170 made a swipe gesture associated with the first direction, the downward direction (not depicted). The second GUI 400 may be displayed such that a first distance (not numbered) between the first interface element 310 and the second interface element 320 (as depicted in FIG. 3) is collapsed, and such that the second GUI 400 does not include the third interface element 330 and the logo 213. As such, the entire second interface element 430 may include the part of the second interface element 320, with the part of the second interface element 320 comprising the first icon 321, the second icon 322, the third icon 323 and the fourth icon 324, and may comprise the other part of the second interface element 420, which comprises a fifth icon 425, a sixth icon 426, a seventh icon 427 and an eighth icon 428. Generally, the other part of the second interface element 420 may have the same visual appearance as the part of the second interface element 320, as the other part of the second interface element 420 is a continuation of the part of the second interface element 320. As with the part of the second interface element 320, the fifth icon 425, the sixth icon 426, the seventh icon 427 and the eighth icon 428 of the other part of the second interface element 420 may each comprise only a graphical representation, only a textual representation or a combination of graphical and textual representation of an associated network resource.

In some embodiments, each one of the fifth icon 425, the sixth icon 426, the seventh icon 427 and the eighth icon 428 may be a static graphical representation such as an image. In some embodiments, each one of the fifth icon 425 and the sixth icon 426, the seventh icon 427 and the eighth icon 428 may be a dynamic graphical representation, such as, but not limited to a short video or GIF. In this example, the fifth icon 425 may be a newspaper icon linking to website news.yandex.ru, and the sixth icon 426 may be the Google logo with Gmail written below linking to mail.google.com. The seventh icon 427 may be the Macrumors logo linking to www.macrumors.com and the eighth icon 428 may be a lightbulb picture with the USTPO acronym linking to www.uspto.gov. In the example depicted herein, the second GUI 400 with the entire second interface element 430 may be used to associate and display the favorite or bookmarked network resources or websites of the user 170, the history of internet browsing of the user 170 and/or other websites chosen by the user 170 for having a quick access to those websites in the form of icons. The icons (e.g. each one of the first icon 321, the first icon 321, the second icon 322, the third icon 323, the fourth icon 324, the fifth icon 425, the sixth icon 426, the seventh icon 427 and the eighth icon 428) of the entire the second interface element 430 may also be referred to as static icons, meaning they are associated with user-selected content and/or based on an action associated with the user, such as, but not limited to, previously consulted websites. There may be a pre-defined number of icons that can be chosen to be a portion of the second GUI 400.

In some embodiments, the pre-defined number of icons may depend on parameters associated with the electronic device 210, such as, but not limited to, screen size, resolution and/or orientation.

Figure 5:
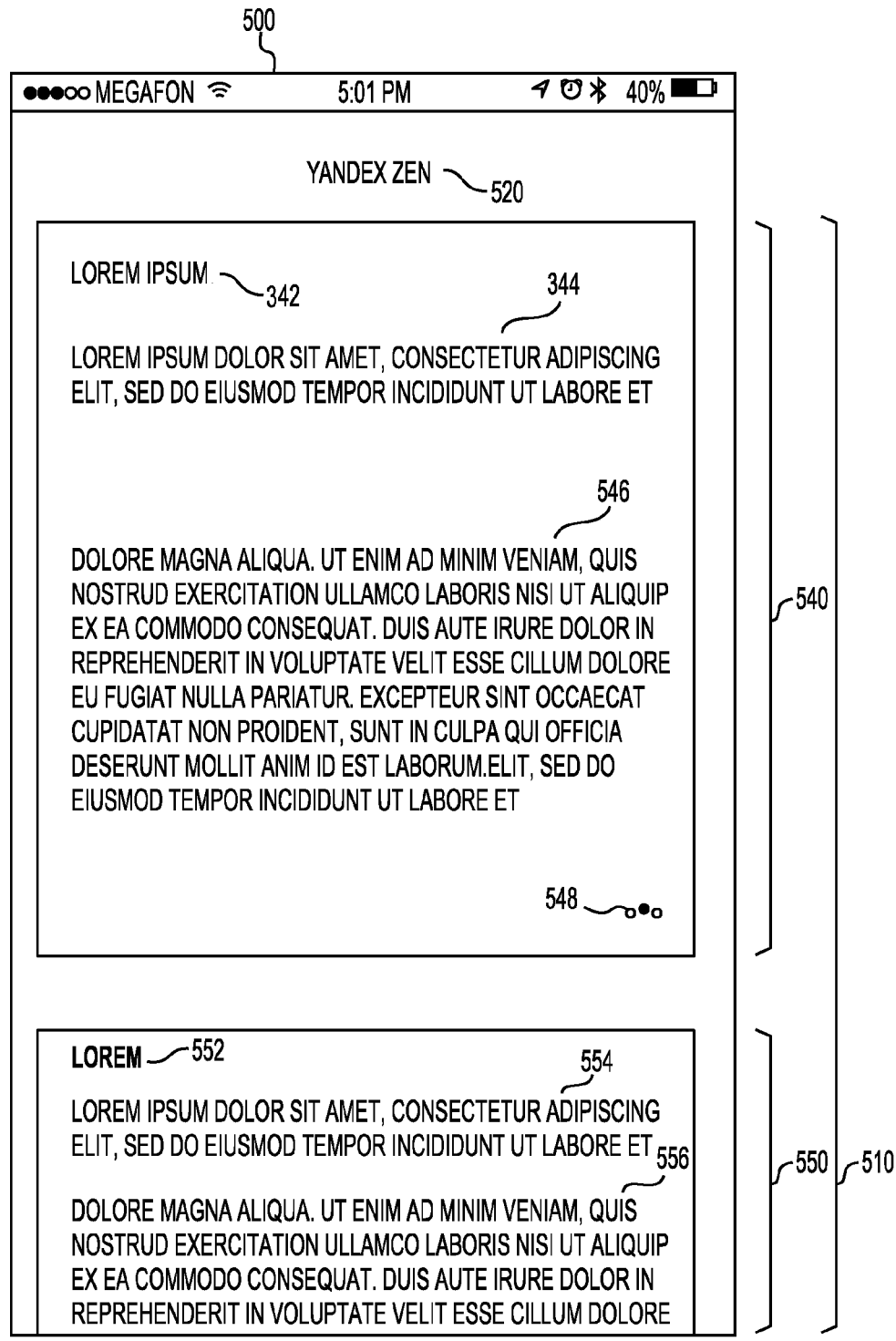
FIG. 5 is a diagram of a second graphical user interface (GUI) comprising a third interface element displayed on the computer system of FIG. 1 via a browser application in accordance with an embodiment of the present technology.

Turning now to FIG. 5, there is depicted another version of the second GUI 400, the second GUI 500, being displayable after the user 170 has executed a user-gesture associated with the second direction, the upward direction, on the first GUI 300. The second GUI 500 may comprise a logo 520 and an entire third interface element 510, meaning the third interface element 510 may occupy the rest of the display space taken by the browser application 215 on the touchscreen 190 of the electronic device 210. In the example depicted herein, the logo 520 is the Yandex™ Zen™ logo, placed above the entire third interface element 510. In some embodiments, the logo 520 may be another interactive element associated with an action. In other embodiments, the logo 520 may be omitted altogether or be placed at a different location (for example, below the third interface element 510 or within the third interface element 510).

The entire third interface element 510 may comprise an entire first recommendation icon 540 and a portion of a second recommendation icon 550. The entire first recommendation icon 540 may include the part of the first recommendation icon 340 displayed on the first GUI 300 and the rest of the first recommendation icon (not numbered), which was not visible on the first GUI 300. A recommendation icon can be referred to as a dynamic recommendation icon, meaning the icon and its content may be defined and suggested by way of a machine-learning algorithm without user-actions or with minimal user-actions. Generally, the entire third interface element 510 may be a recommended content stream (not numbered) comprising at least one recommendation icon associated with the recommended content. A recommendation icon may be displayed in the form of a card, where dynamic content and data types from different sources may be displayed in a standardized interactive format to facilitate browsing recommended content in a recommended content stream. The entire first recommendation icon 540 may be associated with recommended content and may comprise a logo 342, the logo 342 coming from the source of the recommended content. In some embodiments, the logo 342 may be omitted or be placed at a different location. The entire first recommendation icon 540 may comprise a title of the recommended content 344. The entire first recommendation icon 540 may further comprise an excerpt of the recommended content 546. The entire first recommendation icon 540 may further comprise an option button 548, the option button 548 giving access to options for the recommended content (not depicted). The entire first recommendation icon 540 may act as a hyperlink (not depicted) to the recommended content, which the user 170 may access by tapping on any part of the entire first recommendation icon 540, which may trigger the browser application 215 to open a third GUI (not depicted) for displaying the recommended content item as hosted by the source of the recommended content item (in the depicted illustration, a web page with the recommended article). In some embodiments, a recommendation icon could be divided in more recommendation icons. In other embodiments, a recommendation icon could expand to reveal more content, responsive to a user-gesture such as, but not limited to, a long press gesture or a double tap touch gesture. In some embodiments, a user-gesture may be determined to be a long press if a touch user-gesture is over a pre-determined threshold of time.

In some embodiments, the hyperlink (not depicted) may trigger the electronic device 210 to open an application associated with the recommended content. Positioned underneath the entire first recommendation icon 540 may be a portion of a second recommendation icon 550 being part of the entire third interface element 510. As with the entire first recommendation icon 540, the part of a second recommendation icon 550 may be associated with another recommended content (not numbered) and may comprise a logo 552, a title 554 and a portion of an excerpt of the other recommended content 556. In some embodiments, the entire third interface element 510 may comprise other recommended content than news articles, such as social media posts, RSS feeds, electronic messages, information associated with the user and its localisation such as weather, traffic, directions, or any other relevant information.

Figure 6:
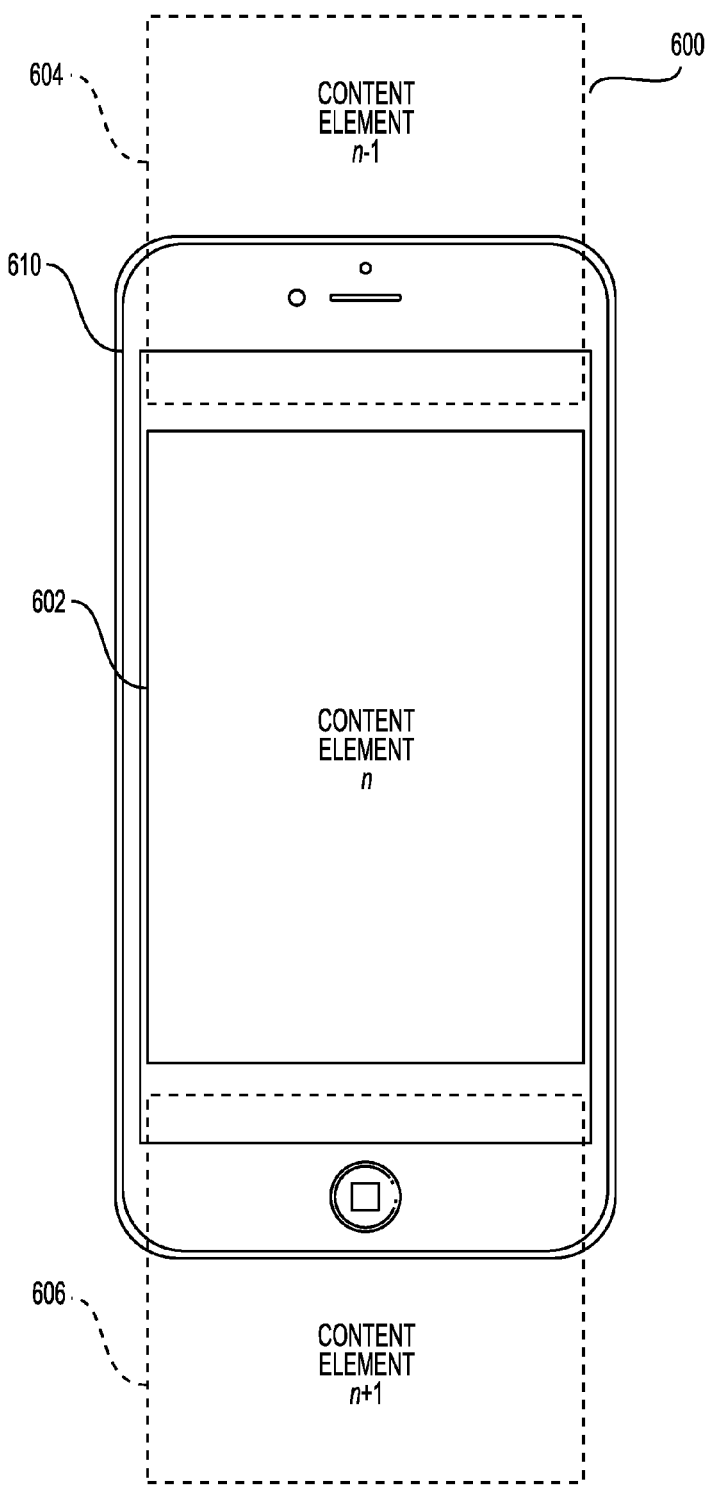
FIG. 6 is a diagram of a recommended content stream that is part of the third interface element in accordance with an embodiment of the present technology.

Reference is now made to FIG. 6 which schematically depicts a recommended content stream 600 associated with the third interface element 330. As depicted in FIG. 6, at any given time at least a portion of the recommended content stream 600 (namely, the content element n) is displayed on the electronic device 210 (for example by the browser application 215), while other portions of the recommended content stream 600 (namely content element n−1 and content element n+1) are available for displaying.

In order to facilitate understanding of how the recommended content stream 600 is structured and how the user 170 may interact with the recommended content stream 600, a recommendation icon 602 is represented as a content element n, which may be, as an example, the second recommendation icon 550, after the user has swiped his/her finger to display the entire content of the second recommendation icon 550. A previous recommendation icon 604 and a next recommendation icon 606 are also represented. The previous recommendation icon 604 is represented as a content element n−1, which may be the first recommendation icon 540. The next recommendation icon 606 is represented as a content element n+1, which may be a third recommendation icon (not numbered).

The recommendation icons 602, 604, 606 are aligned so as to define a vertical recommended content stream 600 when a user, for example the user 170, holds the electronic device 210. The recommendation icon 602 represented by content element n is defined by a rectangle positioned so that it is entirely displayed on the screen of the electronic device 210. As a result, the recommendation icon 602 represented by content element n may be defined as being an active content element as it is entirely visible to the user 170. In addition, the user 170 may also interact with the recommendation icon 602, for example to provide feedback associated with the recommendation icon 602 and/or to cause an action in relation with recommendation icon 602.

In the example of FIG. 6, a bottom portion of the recommendation icon 604 and a top portion of the recommendation icon 606 are also visible. In some embodiments, even though the recommendation icons 604 and 606 are not entirely visible to the user 170, the user 170 may still interact with the recommendation icons 604 and 606 in a similar way than she/he would have had with the recommendation icon 602. In some embodiments, the user 170 may interact with the recommended content stream 600 by completing a swiping gesture on the touch hardware 194 of the electronic device 210. The swiping gesture may be oriented in the second direction from bottom to top (with respect to a point of view of a user holding the electronic device 210 vertically) so as to cause a third visual transition resulting in the recommendation icon 606 to be displayed (partially or entirely) instead of the recommendation icon 602.

Conversely, a swiping gesture associated with the first direction from top to bottom causes a fourth visual transition resulting in the recommendation icon 604 to be displayed (partially or entirely) instead of the recommendation icon 602. As a result, in some embodiments, the user 170 may navigate through multiple recommendation icons forming the recommended content stream 600 by scrolling the recommended content stream 600 in the first direction and/or the second direction, the first direction and the second direction being, in the embodiment illustrated at FIG. 6, along the vertical direction (e.g., upward direction and downward direction). Other variations as to how the user 170 may interact with the recommended content stream 600 are also envisioned without departing from the scope of the present technology, including embodiments where the user 170 interacts with the recommended content stream 600 and/or the recommendation icons 602, 604, 606 through interfaces of the electronic devices 210 other than the touchscreen 190 (for example, via voice commands, remote visual gestures, mouse, keyboard, a pointing device, etc).

In some embodiments, the recommended content stream 600 may be organized so that the recommendation icons 602, 604, 606 comprising the recommended content elements are organized in a particular fashion, for example, but without being limitative, in a chronological order or in a priority order, such as an order of relevancy to the user 170. Alternatively, recommendation icons 602, 604, 606 could be organized by source clusters such as news first, blogs posts next, etc. In some embodiments, the organization of the recommended contents may be chosen by the user 170 so as to display certain categories of recommended content before others. As an example, the recommendation icon 602 may be associated with current information, the recommendation icon 604 may be associated with older information and the recommendation icon 606 will be associated with newer information. Other variations as to how the content elements may be ordered may be envisioned without departing from the scope of the present technology, including an embodiment wherein the recommendation icons are simply not organized in any fashion.

In some embodiments, the browser application 215 running on the electronic device 210 may comprise a content aggregator type module capable of sourcing media content from any suitable number of data sources. In some embodiments, the sourcing is directly conducted by the electronic device 210. In some alternative embodiments, the sourcing is conducted by the server 222 and/or jointly by the electronic device 210 and the server 222. The sourced media content may be processed by the electronic device 210 and/or the server 222 to generate recommendation icons associated with content elements, such as the recommendation icons 602, 604, 606. In some embodiments, such media content may be referred to as media asset. The sourced content may be any suitable media such as, for example, printed media, video media and/or audio media. In such embodiments, the recommended content stream 600 may define a media asset feed. In some alternative embodiments, the recommendation icons associated with content elements may be generated from other resources, for example from one or more social networks. Other variations may also be envisioned as to what type of information and/or source of information may be used to generate the content elements without departing from the scope of the present technology.

In some embodiments, each one of the recommendation icons 602, 604, 606 comprises information which allows the user 170 to determine whether she/he wishes to learn more about a topic associated with the information. For example, one of the recommendation icons 602, 604, 606 may represent a succinct article. When viewed by the user 170, the one of the recommendation icons 602, 604, 606 comprises enough information so that the user 170 is enabled to make a judgment as to whether she/he wants to take an action in connection with the one of recommendation icons 602, 604, 606.

In yet some alternative embodiments, the recommendation icon 602, 604, 606 associated with the content element may be divided into portions, each one of the portions being associated with a different media asset and/or a different piece of information and/or a different type of information. Alternatively, multiple media assets and/or pieces of information and/or types of information may be presented on a single content element. Multiple variations and arrangements may be therefore envisioned without departing from the scope of the present technology.

Figure 7:
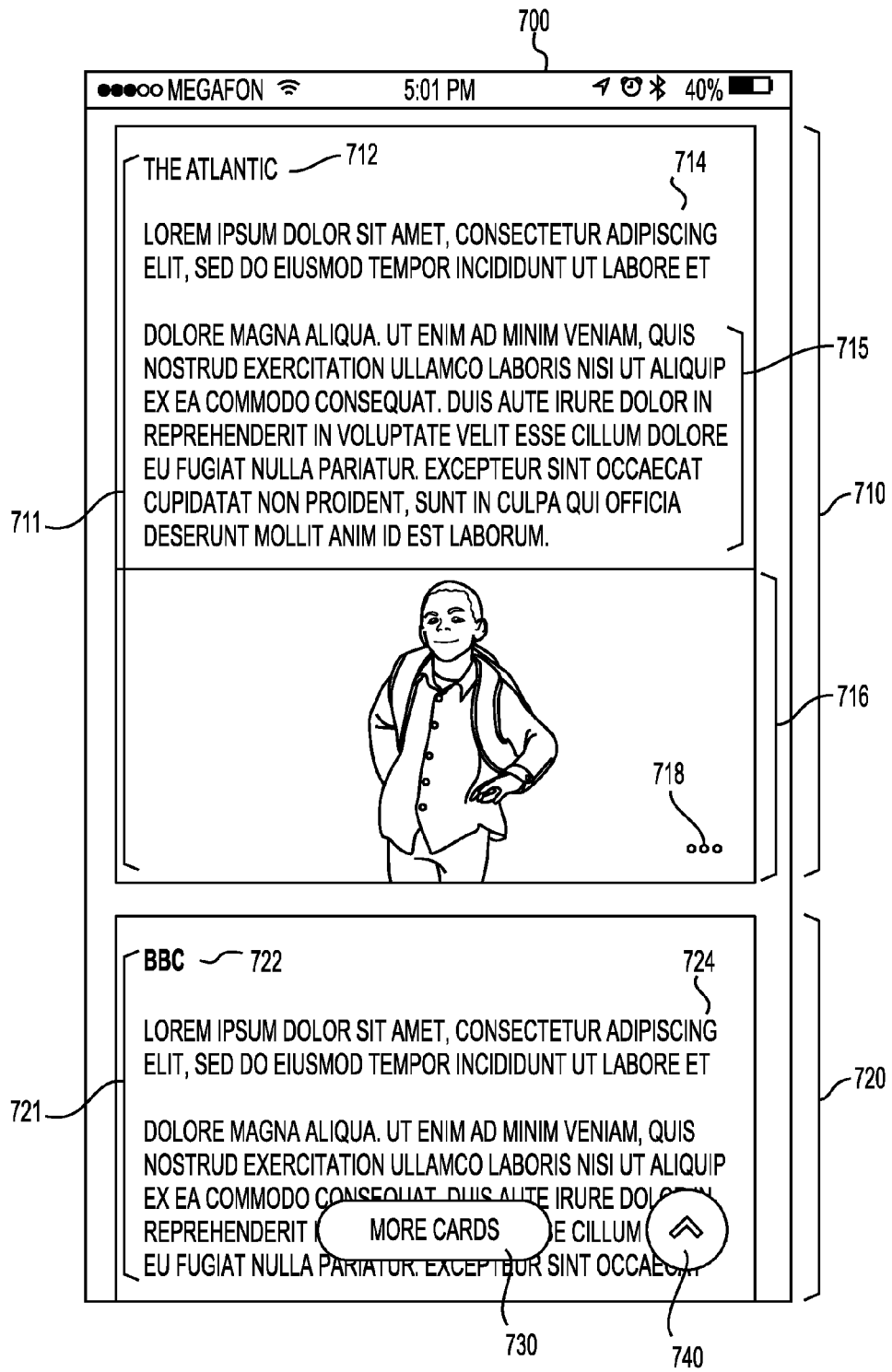
FIG. 7 is a diagram of the second GUI after a user interaction in accordance with an embodiment of the present technology.

Turning now to FIG. 7, there is depicted the second GUI 500 after the user 170 has swiped in the second direction, the upward direction, and slightly swiped in the first direction, the downward direction, which may have caused appearance of: a more cards button 730 and a back button 740. In the example depicted herein, the second GUI 500 of FIG. 7 includes a third recommendation icon 710 and a portion of a fourth recommendation icon 720. The third recommendation icon 710 comprises a source logo 712, a title 714, a text 715, a picture 716 and an options button 718. The part of the fourth recommendation icon 720 comprises a source logo 722, a title 724 and a text 725. Superimposed at the bottom of the part of the fourth recommendation icon 720 are the more cards button 730 and the back button 740, the more cards button 730 and the back button 740 appearing when the user 170 executed a short swipe in the first direction. The more cards button 730 may be associated with an action to display more recommendation icons cards by the recommendation system of the browser application 215. The back button 740 may be associated with an action to automatically scroll back to the first GUI 300.

Figure 8:
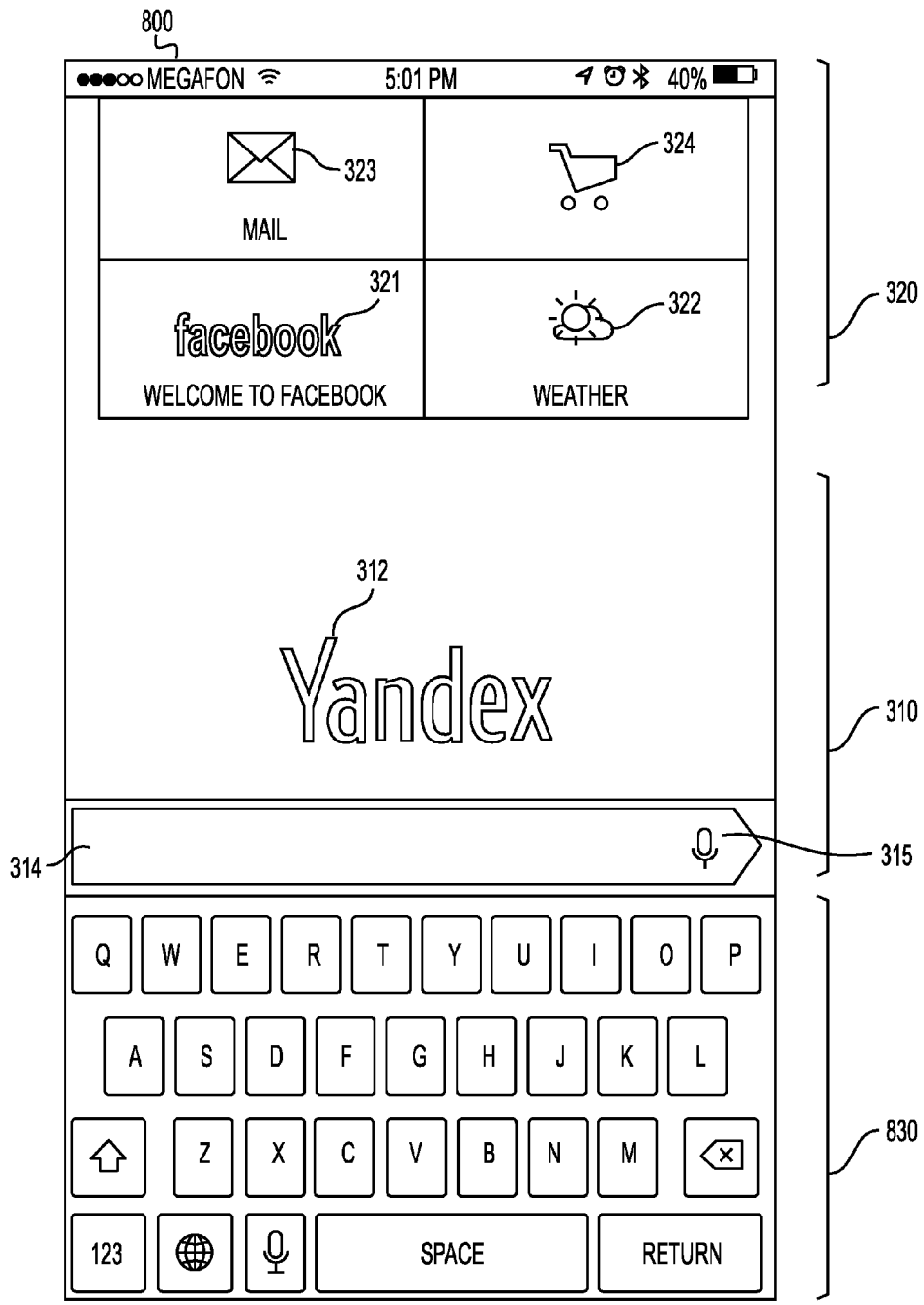
FIG. 8 is a diagram of the first GUI after a user interaction with the first interface element in accordance with an embodiment of the present technology.

Turning now to FIG. 8, there is depicted the first GUI 300 with the user 170 having selected the omnibox 314 of the first interface element 310 in accordance with an embodiment of the present technology. The browser application 215 of the electronic device 210, having received a touch user-gesture indication on the omnibox 314, may display an application keyboard 830 for the user 170 to type a search request or a URL. The omnibox 314 may further comprise a microphone icon 315, the microphone icon 315 for entering a voice input via the microphone of the electronic device 210. The application keyboard 830 may be a default application keyboard from the OS of the electronic device 210, a default application keyboard of the browser application 215, or another application keyboard allowing the user to input a text query. In some embodiments, the application keyboard 830 may not be present, as the electronic device 210 may have detected that a physical keyboard (not depicted) has been attached to the electronic device 210.

Figure 9A:
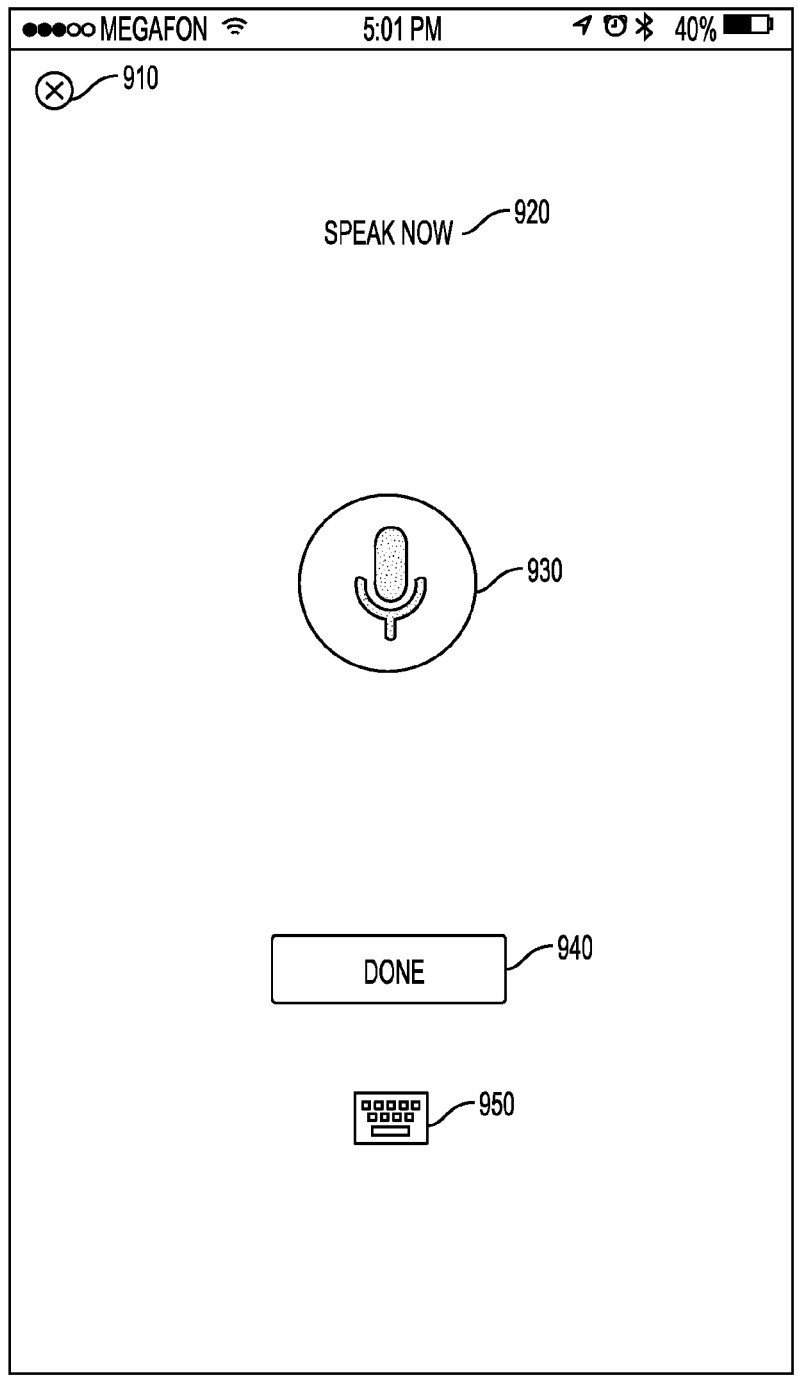
FIG. 9*a*, 9*b*, 9*c* are diagrams of a portion of the second GUI after a user interaction with a microphone icon of the first interface element in accordance with an embodiment of the present technology.
Figure 9B:
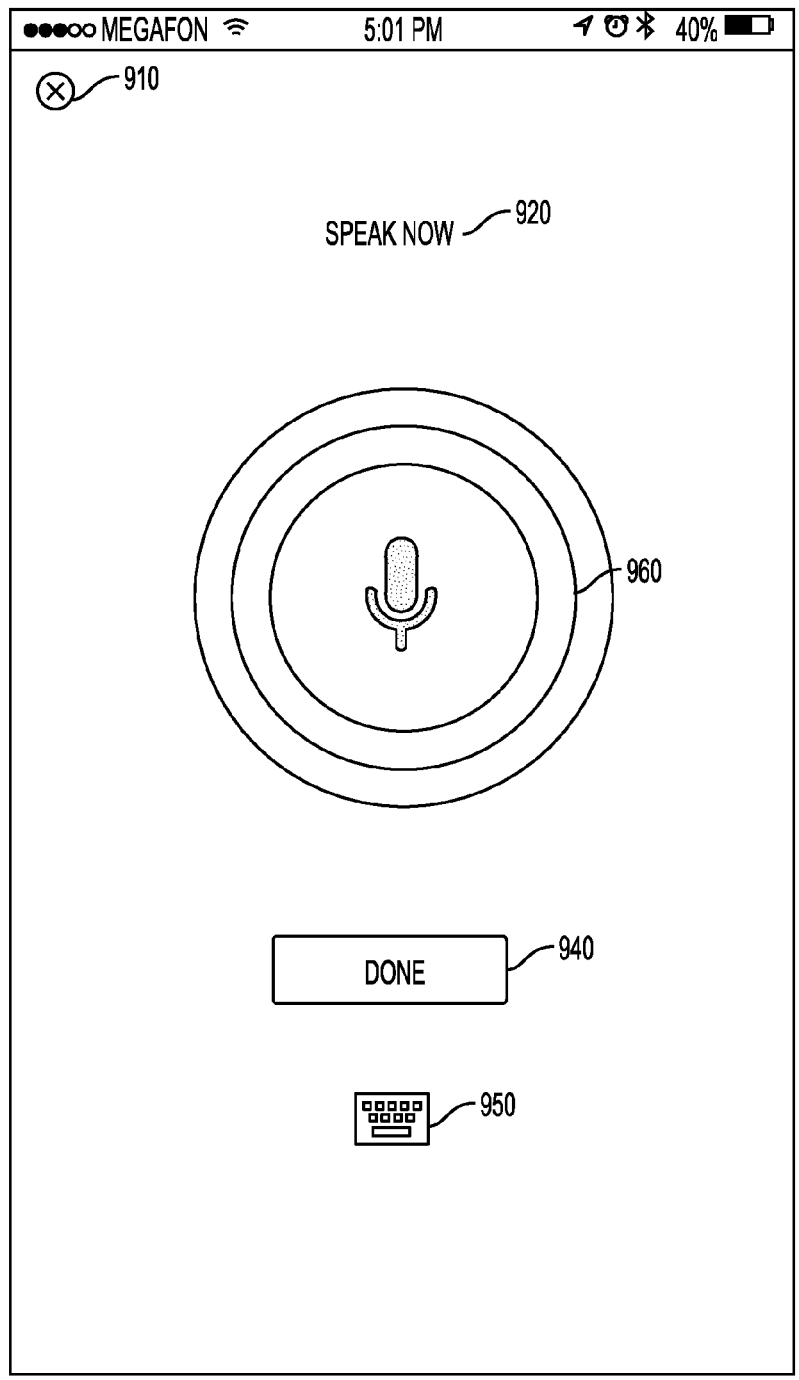
Figure 9C:
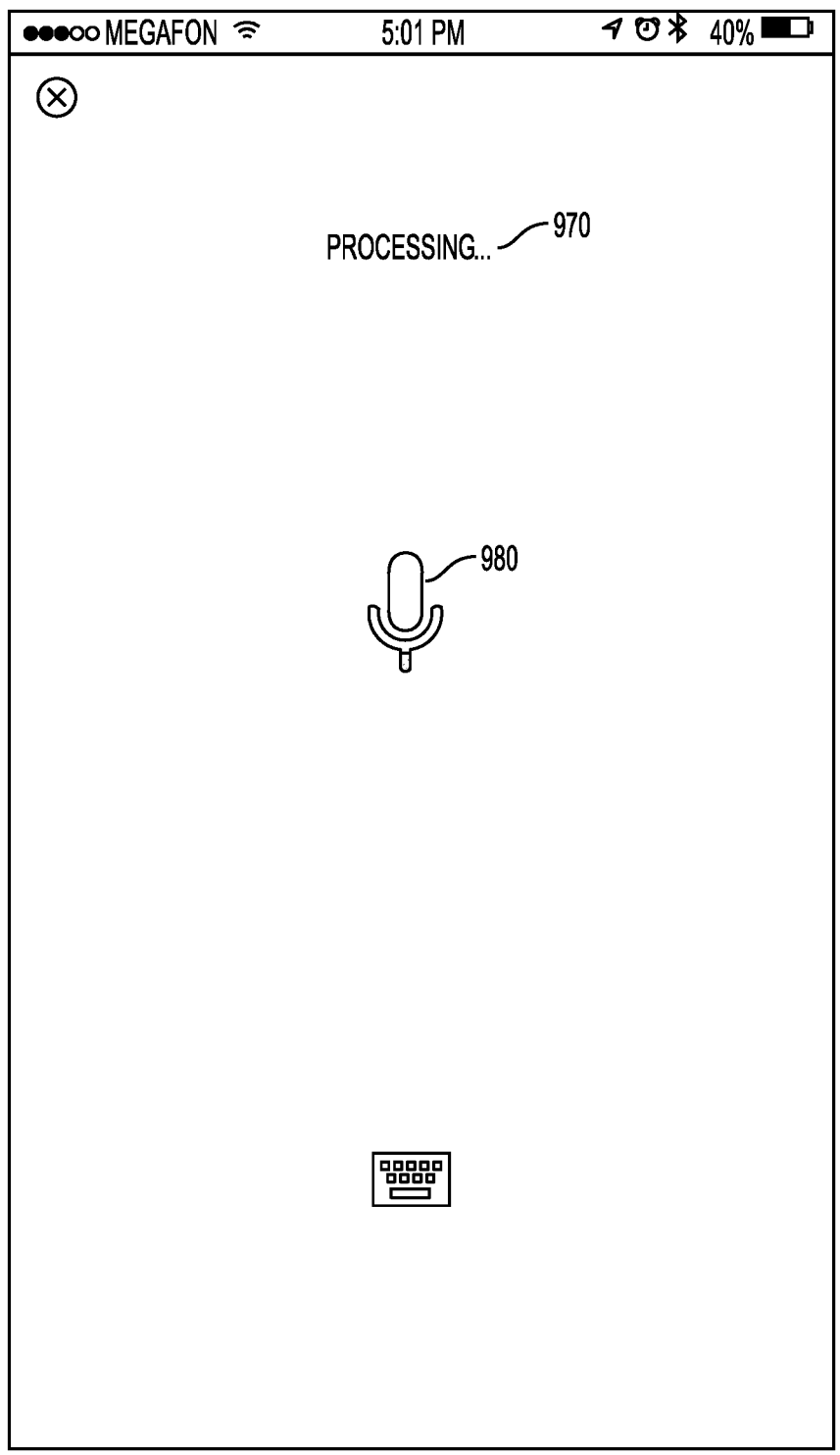

Turning now to FIG. 9a-9c, there is depicted an embodiment where the user 170 has selected the microphone icon 315 of the first GUI 300 to input a voice input via the electronic device 210. A voice input screen 900, which is part of the browser application 215, may be presented to the user 170. The voice input screen 900 may comprise a cancel icon 910, a text indication 920 reading "Speak now", a microphone icon 930, a done button 940 and an application keyboard button 950. The user 170 may speak into the microphone (not depicted) of the electronic device 210 to input a voice-based command. The user 170 may receive a feedback animation icon 960 while she/he is speaking, as depicted in FIG. 9b. The feedback animation icon 960 may indicate that the electronic device 210 is receiving the voice input. The user 170 may then select a done button 940 to indicate that she/he has finished speaking her/his voice request, and the browser application 215 may then process the voice request by displaying a processing text 970 and an animated progress icon 980, as depicted in FIG. 9c. The animated progress icon 980 may indicate how far the browser application 215 is in the processing of the voice request, the animated progress icon 980 being in the form of a microphone with a progress bar vertically filling the animated progress icon 980. In some embodiments, the voice input screen 900 may appear on a portion of the first GUI 300. In other embodiments, the user 170 may speak requests other than search requests, such as action requests to access the second interface element 320 or the third interface element 330.

Figure 10:
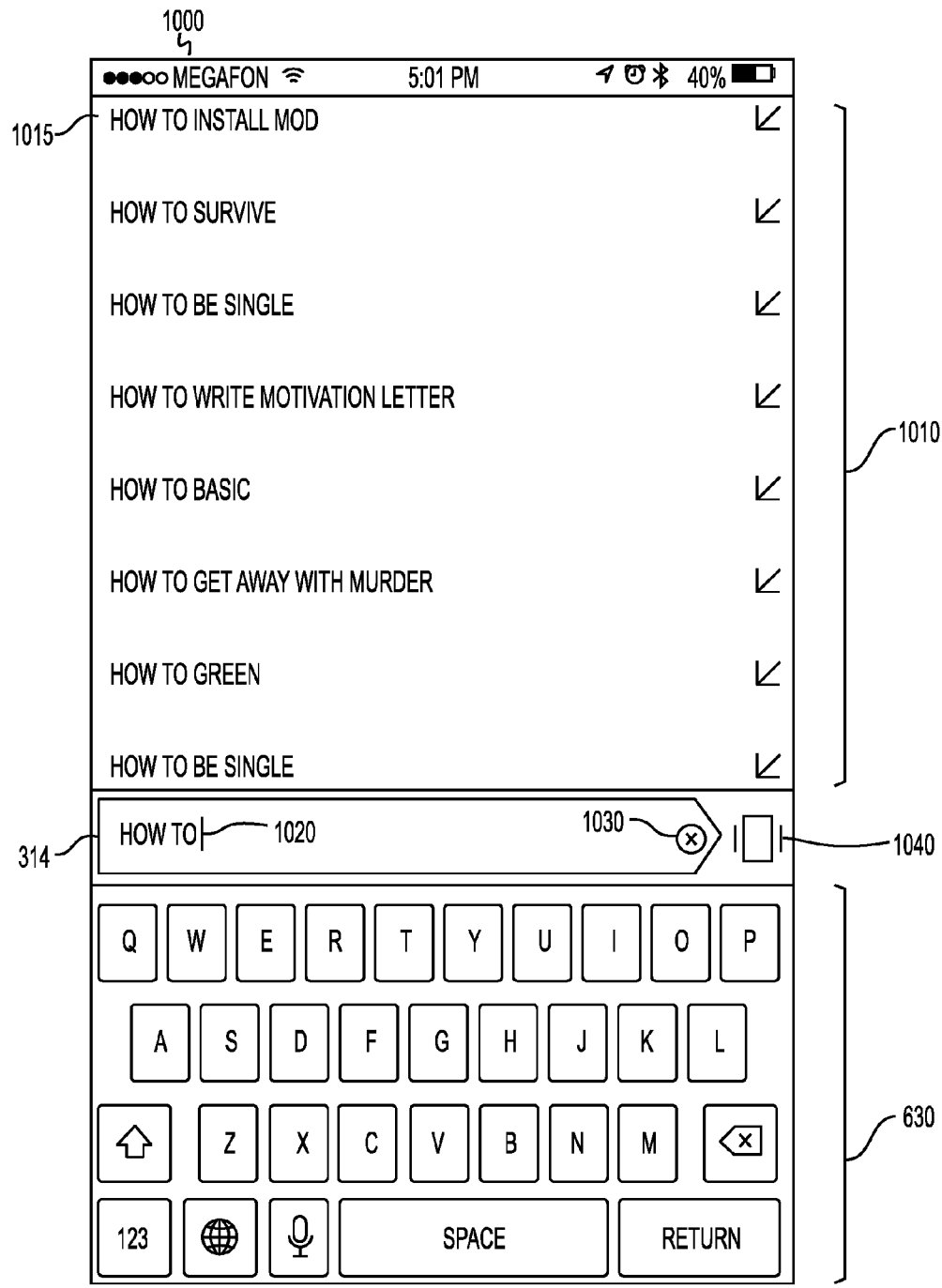
FIG. 10 is a diagram of the first GUI after a user has begun typing a request in the first interface element in accordance with an embodiment of the present technology.

Turning now to FIG. 10, there is depicted a search term 1020 being typed in the omnibox 314 of the first GUI 300 in accordance with an embodiment of the present technology. After having received a touch user-gesture indication on the omnibox 314 as depicted in FIG. 8, the user 170 may start entering the search term 1020 via the application keyboard 630 in the omnibox 314. The omnibox 314, having received an indication of keying events on the application keyboard 630, may replace the microphone icon 315 by a second icon 1030, the second icon 1030 being associated with an action to delete the search term 1020. The omnibox 314 may further comprise a third icon 1040, the third icon 1040 being an icon to indicate to switch tabs in the browser application 215. As the search term 1020 is being typed in the omnibox 314, the browser application 215 may display search suggestions 1010 associated with the search term 1020. In this example, the search term has been typed as "how to" and a list of search suggestions 1010 are presented, the list containing search suggestions 1010 related to the search term 1020 such as "how to install mod", "how to survive", "how to be single", "how to write a motivation letter", "how to basic", "how to get away with murder", "how to green" and "how to be single". The user 170 may select a suggested term 1015 if the suggested term 1015 is related to what the user 170 planned on typing.

Figure 11:
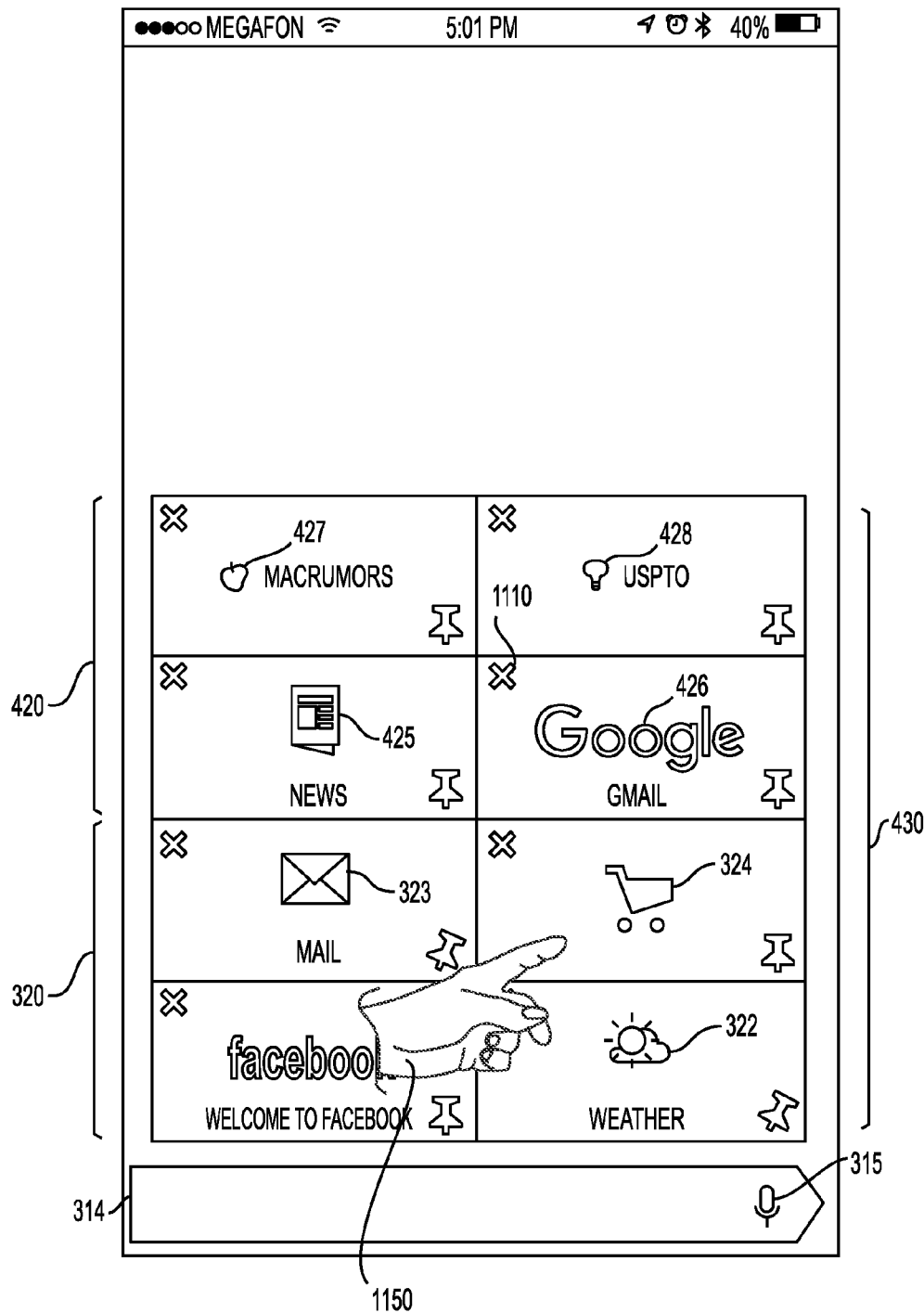
FIG. 11 is a diagram of the second GUI after a user interaction with the second interface element in accordance with an embodiment of the present technology.

Reference is now made to FIG. 11, which depicts a scenario where the user 170 has performed a long press on any one of the first icon 321, the second icon 322, the third icon 323, the fourth icon 324, the fifth icon 425 and the sixth icon 426 of the second GUI 400 in accordance with an embodiment of the present technology. The user 170 may want to add, move, modify or delete at least one icon associated with a network resource in the entire second interface element 430 by performing a long press on any one of the icons, and responsive to the long press, the browser application 215 may display a first icon indicator 1110 and a second icon indicator 1120 on each one of the first icon 321, the second icon 322, the third icon 323, the fourth icon 324, the fifth icon 425 and the sixth icon 426. The first icon indicator 1110 may be located on the top left corner of the icon and indicate an action to delete the respective icon from the entire second interface element 430. The second icon indicator 1120 may be located at the bottom right of the icon and depict a pin icon, which indicates an action to pin the icon on the entire second interface element 430 such that the pinned icon remains on the entire second interface element 430. The user 170 may return to the second GUI 400 by tapping on a portion of the second GUI 400 other than one of the first icon 321, the second icon 322, the third icon 323, the fourth icon 324, the fifth icon 425 and the sixth icon 426.

Figure 12A:
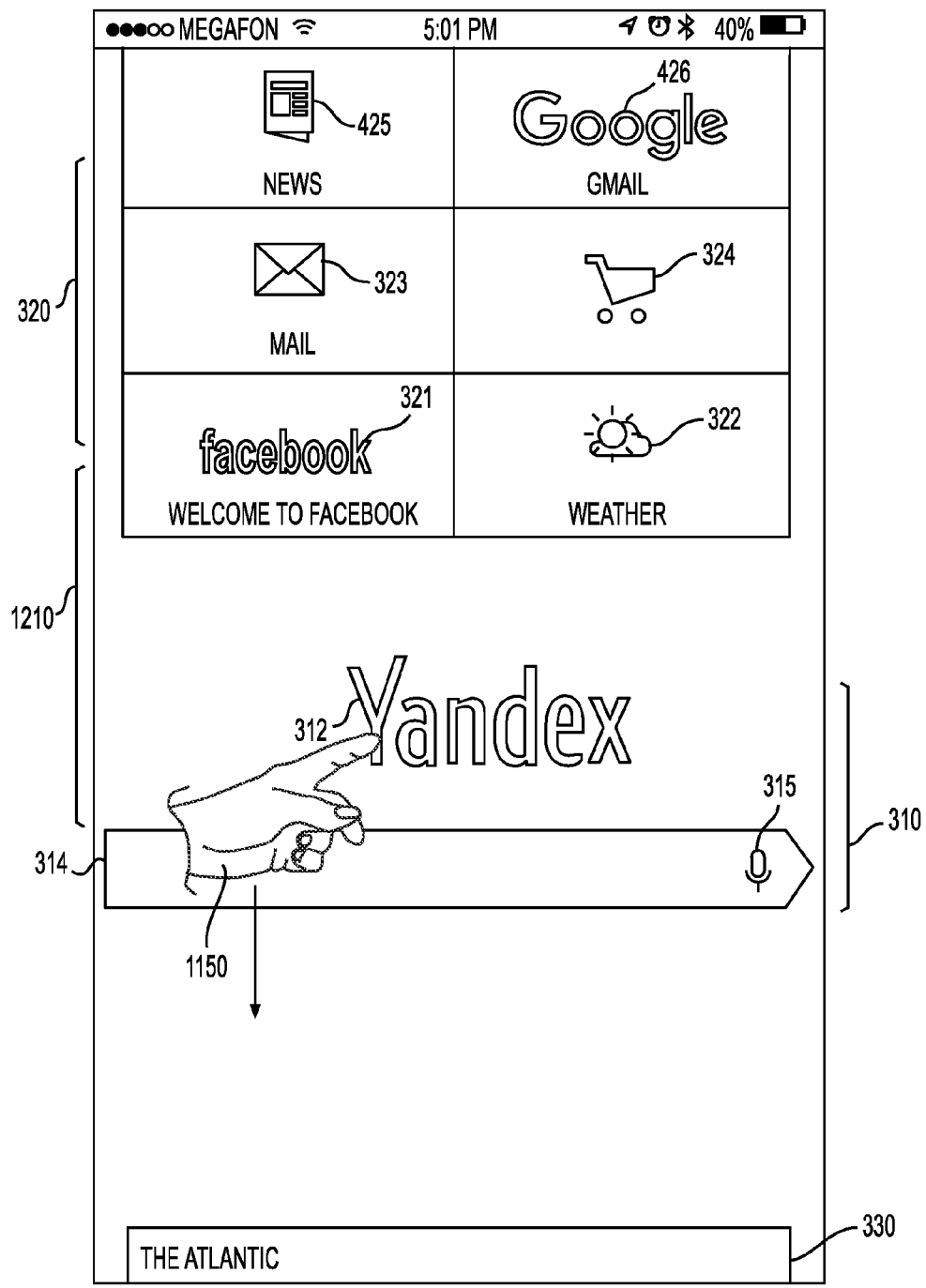
FIGS. 12a-12c are diagrams of a first visual transition associated with the first direction from the first GUI to the second GUI in accordance with an embodiment of the present technology.
Figure 12B:
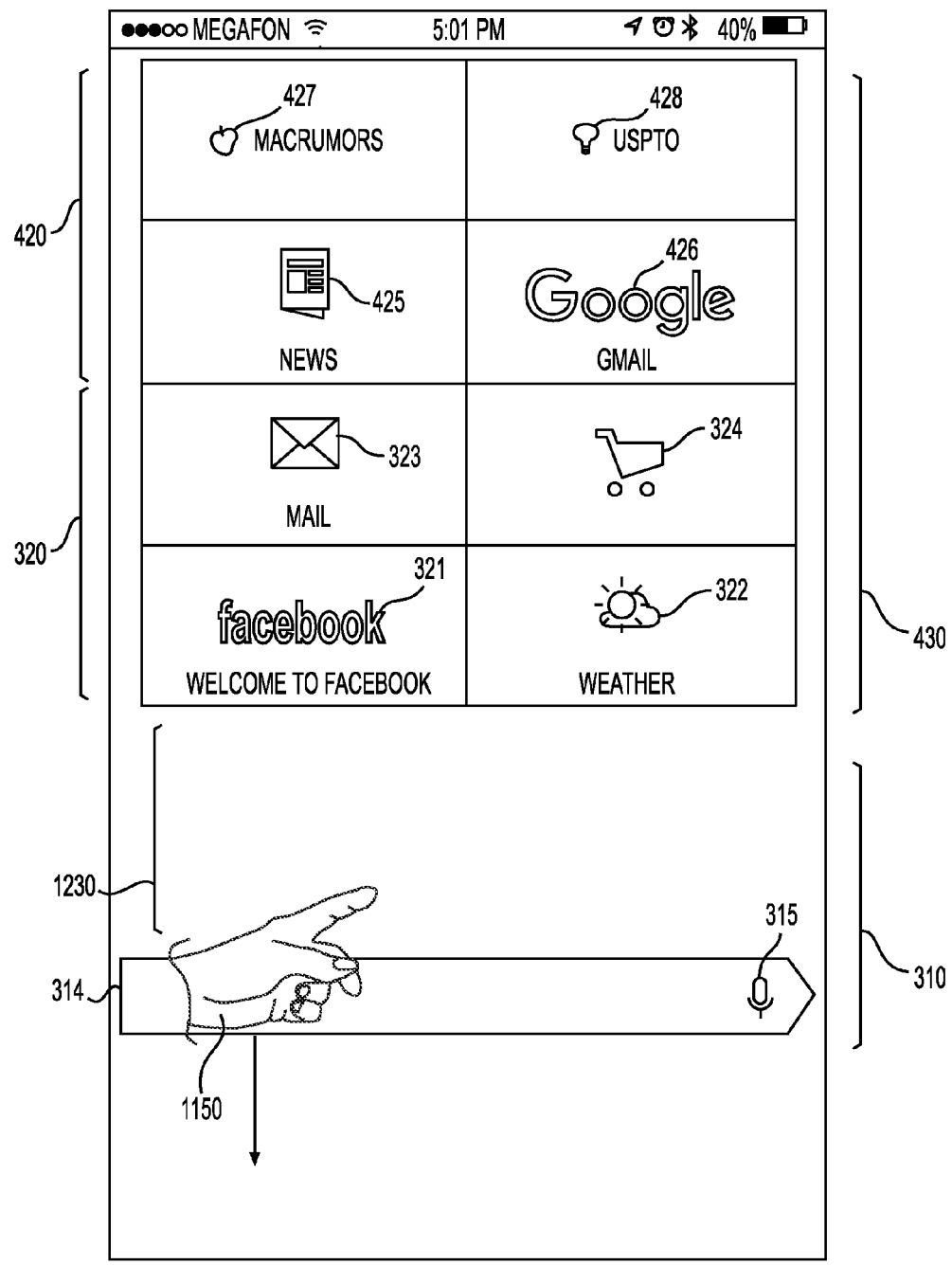
Figure 12C:
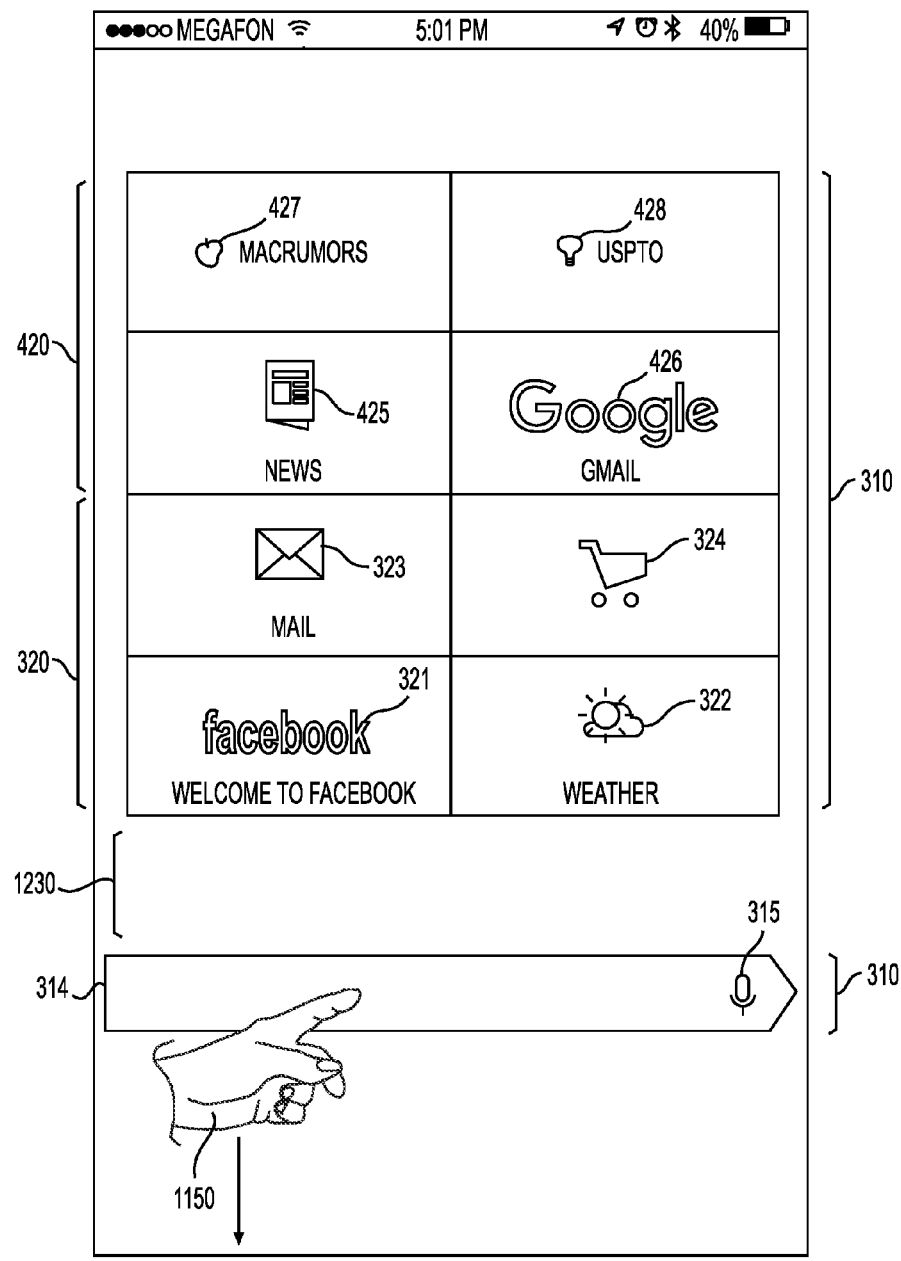

Turning now to FIG. 12*a*-12*c*, there is depicted a first transition between the first GUI 300 and the second GUI 400 in accordance with an embodiment of the present technology. The user 170 may want to move to the entire second interface element 430 of the browser application 215 to select a predefined icon (one of the first icon 321, the second icon 322, the third icon 323, the fourth icon 324, the fifth icon 425 and the sixth icon 426) to access a network resource. The user 170 may start to swipe, from any place within the limits of the screen (not depicted) of the electronic device 210, in the first direction, the downward direction. As the user 170 starts sliding her/his finger in the first direction for a first pre-defined threshold number of pixels, the part of the second interface element 320 and the third interface element 330 may start to animate by moving in the first direction, as depicted in FIG. 12*a*, and as the finger moves a certain pre-defined threshold number of pixels, a first space 1210 may start to shrink and the logo 312 may start to slowly fade out. Animation, as referred in the context of the present technology, may refer to the process of making the illusion of motion and change in user-interface elements by means of rapid display of a sequence of static user-interface elements that differ from each other. As the user 170 continues to move her/his finger in the first direction for a second pre-defined threshold number of pixels, as depicted in FIG. 12*b*, the part of the second interface element 320 may continue to move down, revealing the other part of the second interface element 420 and the omnibox 314 may continue to move down. At this stage, the logo 312 and the third interface element 330 may have disappeared, with the first space 1210 shrinking to become the second space 1220. As the user 170 continues to move his finger in the first direction for a third pre-defined threshold number of pixels, as depicted in FIG. 12*c*, the entire second interface element 430 may now have appeared, and the part of the third interface element 330 may have disappeared from the screen of the electronic device 210. Finally, the first transition may end with second GUI 400, as depicted in FIG. 4. As it may be understood, if the user changes her/his mind and starts moving her/his finger in the second direction, the opposite of the process described herein may happen.

Figure 13A:
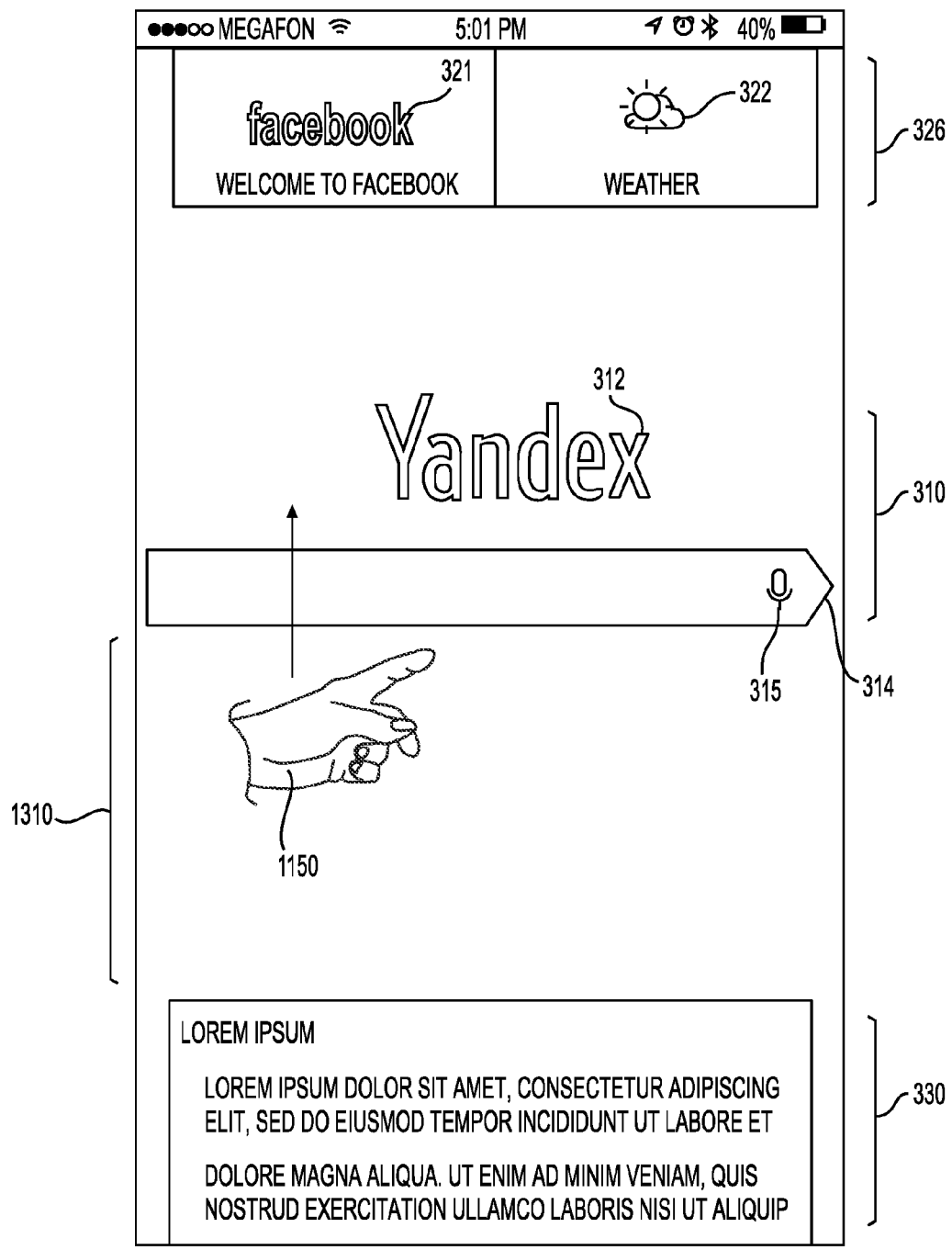
FIGS. 13a-13c are diagrams of a second visual transition associated with the second direction from the first GUI to the second GUI in accordance with an embodiment of the present technology.
Figure 13B:
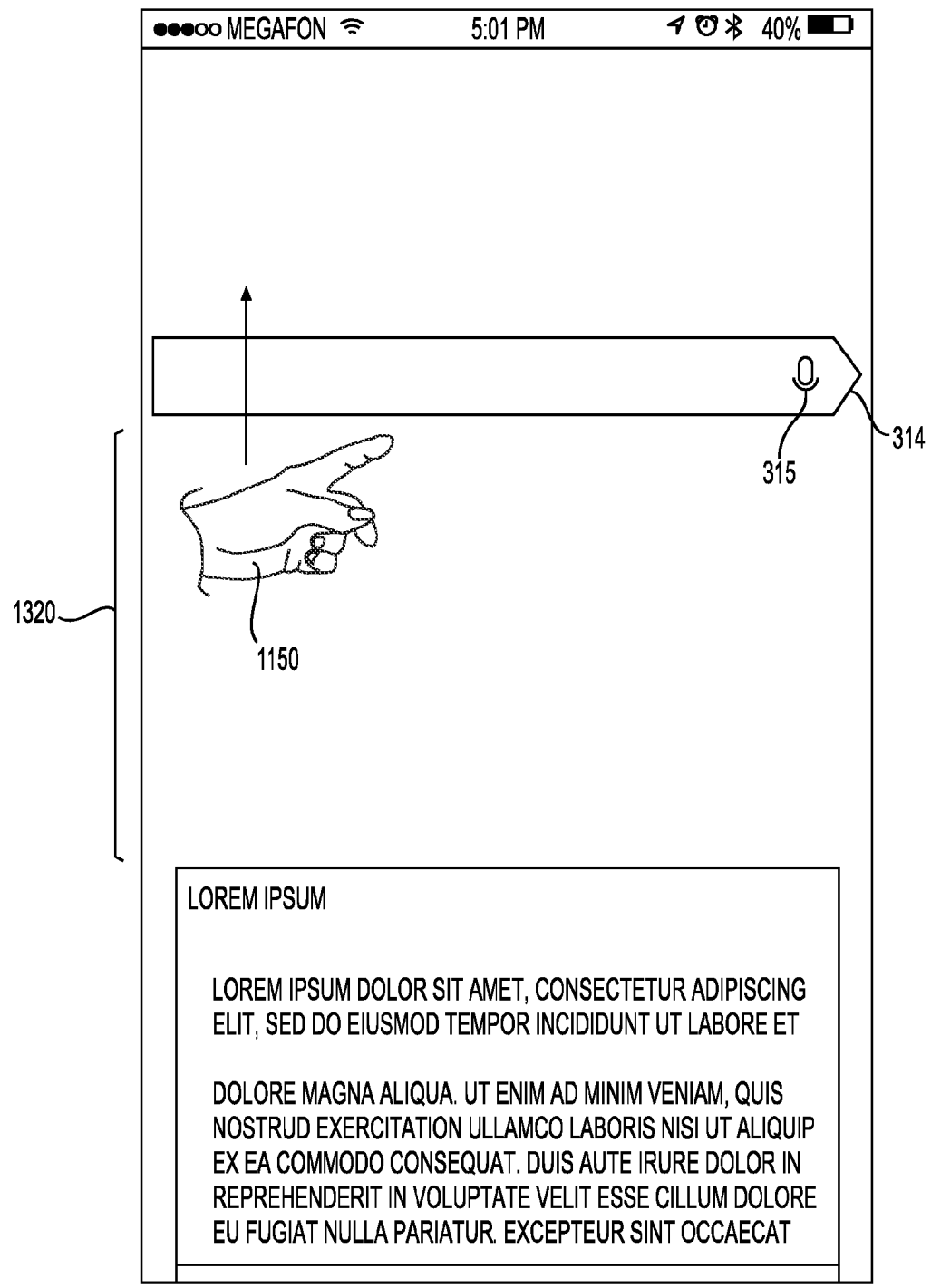
Figure 13C:

Turning now to FIG. 13*a*-13*c*, there is depicted a second transition between the first GUI 300 and the second GUI 500 in accordance with an embodiment of the present technology. Starting from the first GUI 300, the user 170 may want to find recommended content to peruse, such as a news articles. As with the situation in FIG. 12*a*-12*c*, the user 170 may start to swipe, from any place within the limits of the screen of the electronic device 210, in the second direction, the upward direction, to make a second transition to the second GUI 500. As the user 170 starts swiping her/his finger in the second direction for a third pre-defined threshold number of pixels, the part of the second interface element 320 and the third interface element 330 may start to animate by moving in the second direction, hiding a portion of the second interface element 320 and revealing another part of the third interface element 330. At the same time the space 1310 may start to shrink and the logo 312 may start to slowly fade out. As the user 170 continues to move her/his finger in the second direction for a fifth pre-defined threshold number of pixels, as depicted in FIG. 12*b*, the space 1310 may shrink into the space 1320 and the part of the second interface element 320 may continue to move up to disappear from the screen of the electronic device 210, revealing more of the other part of the third interface element 330 as the omnibox 314 also continues to move up. As the user 170 continues to move her/his finger in the second direction for a sixth pre-defined threshold number of pixels, as depicted in FIG. 12*c*, the entire second interface element 420 may now have appeared, and the part of the third interface element 330 may have disappeared. Finally, the second transition may end with second GUI 500, as depicted in FIG. 5. As it may be understood, if the user changes her/his mind and starts moving her/his finger in the second direction, the opposite of the process described herein may happen.

FIG. 12*a*-12*c* and FIG. 13*a*-13*c* were examples of the first transition from the first GUI 300 to the second GUI 400 and the second transition from the first GUI 300 to the second GUI 500 respectively. As it may be understood, the transitions were described as discrete steps, but may appear as continuous transition animations when implemented on the electronic device 210.

Figure 14:
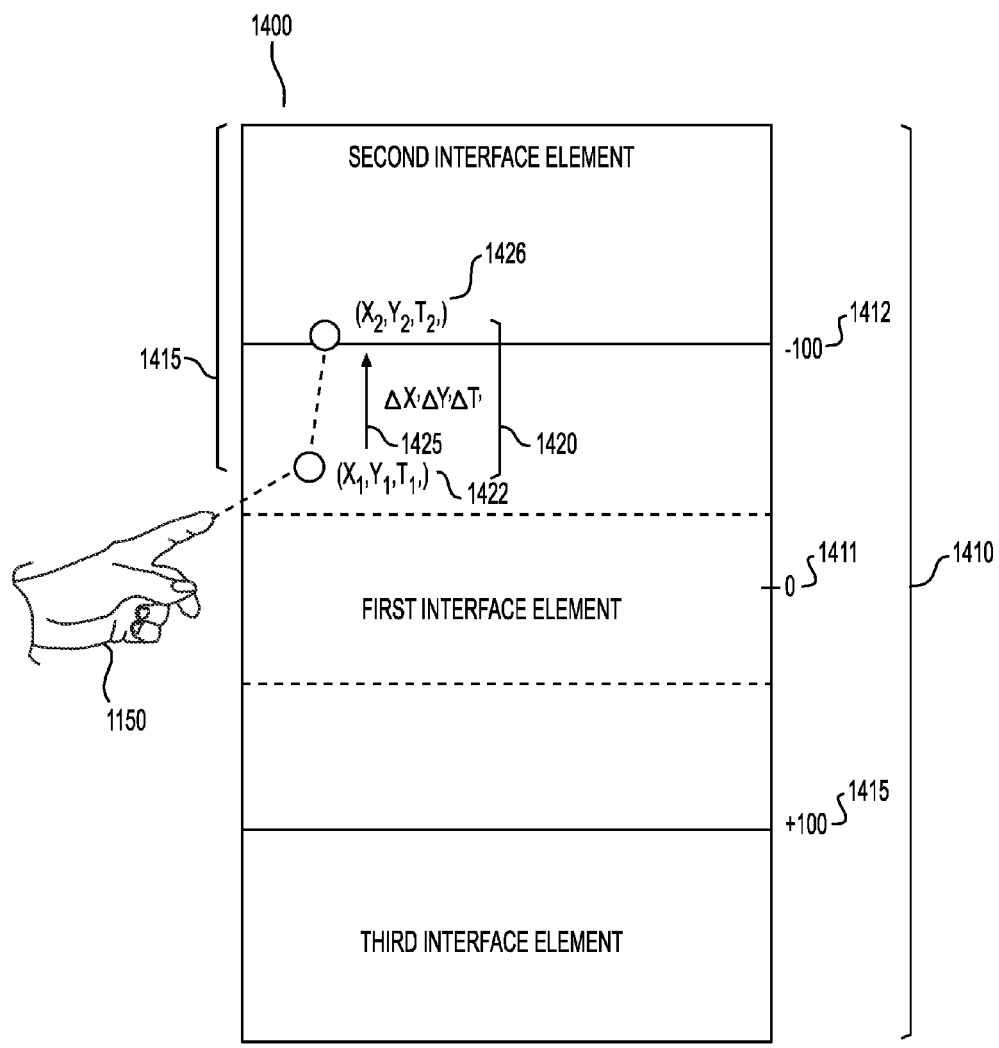
FIG. 14 is a diagram depicting a user interaction with the first GUI in accordance with an embodiment of the present technology.

Reference is now made to FIG. 14, which depicts an example of how the browser application 215 and/or the electronic device 210 may be configured to provide response to user gestures on the first GUI 300 of the electronic device 210 in accordance with an embodiment of the present technology.

Generally, the user 170 may interact with the electronic device 210 and the browser application 215 via touch-based input events such as tapping, pinching, panning or dragging, swiping, rotating, long press, or pressure press on the screen of the electronic device 210 with her/his fingers or with an electronic pencil. In the example depicted herein, the user 170 may generally interact with the electronic device 210 by tapping on an interface element, such as interface element 310, 320 and 330, or swiping to go from one of the interface elements 310, 320 and 330 to another interface element 310, 320 and 330.

The browser application 215 may be configured in such a way as to provide scrolling animation in response to a swiping event, as described previously in FIG. 12*a*-*c* and FIG. 13*a*-*c*. Generally, but not limitatively, the electronic device 210 may be able to return the following information in the case of a touch event: the view or windows in which the touch occurred, the location of the touch in (x,y) coordinates within the view or window, the approximate radius of the touch and the force of the touch, a timestamp indicating when the touch occurred, the number of times the user tapped on screen, and the phase of the touch indicating if the touch began, moved or ended, all depending on how the electronic device 210 is implemented.

As an example, the first GUI 300 may have coordinates 1411 associated the first interface element 310, coordinates 1412 associated with the second interface element 320 and coordinates 1413 associated with the third interface element 330. Each one of the first interface element 310, the second interface element 320 and the third interface element 330 may be aware where each other is located, and may respond to a swipe user-gesture by moving relative to each other and transmit feedback information such as coordinates and time to each other. To detect a swipe movement, the browser application 215 may be implemented to detect a first location 1422 $(x_1, y_1, t_1)$ of the finger 1150 of the user 170 on the screen of the electronic device 210 and store it in memory, detect at least one mid location $(x_n, y_n, t_n)$ (not depicted) of the finger 1150 and detect an end location 1426 $(x_2, y_2, t_2)$ of the finger 1150 of the user 170 to compute at least one delta value (between the first location and the end location). Based on this information, the browser application

215 is configured to determine: if a swipe movement distance 1420 is in a given direction, such as the upward direction 1425, if it is over a pre-determined threshold of distance and/or time.

As described respectively in FIG. 12*a-c* and FIG. 13*a-c*, the different interface elements may start transitioning responsive to the swipe gesture being over a pre-determined threshold of distance in pixels and/or over a pre-determined threshold of time. Generally, the movement and the distance traveled by the different interface elements 310, 320 and 330 during an animated transition may be proportional to the distance traveled by the finger of 1150 of the user 170 during the swiping movement, such as the swipe movement distance 1420. The speed of the animation may depend on or be proportional to the difference of time associated with the start location (such as start location 1422) and the end location (such as end location 1426) of the swipe movement. In some alternative embodiments, the speed of the animation does not need to depend on the swipe movement. The browser application 215 may be configured to, if the finger 1150 of the user 170 during the swipe movement has traveled a distance that is over a threshold of distance and/or time, complete the animation starting from the first GUI 300 going to the second GUI 400 or the second GUI 500, and vice versa. In the opposite case, if the finger 1150 of the user 170 during the swipe movement has traveled the distance that is under a threshold of distance and/or time, the animation may return to where it started (e.g. to the first GUI 300 if the user 170 wanted to display the second GUI 400).

In some embodiments, the finger 1150 of the user 170 may start to swipe from the start location 1422, and the browser application 215 may be configured to consider the rest of the distance 1415 as 100% of the screen, such that the swipe movement distance 1420 is considered relatively to the rest of the distance 1415 having the same effect as if the user 170 started to swipe from the bottom of the screen distance 1410 and covered a longer swiping distance, which allows a better user experience.

The user 170 may further scroll by swiping her/his finger through the second GUI 500 to see new recommendation icons associated with new recommended content selected by the recommendation server, as explained in FIG. 6.

Figure 15:
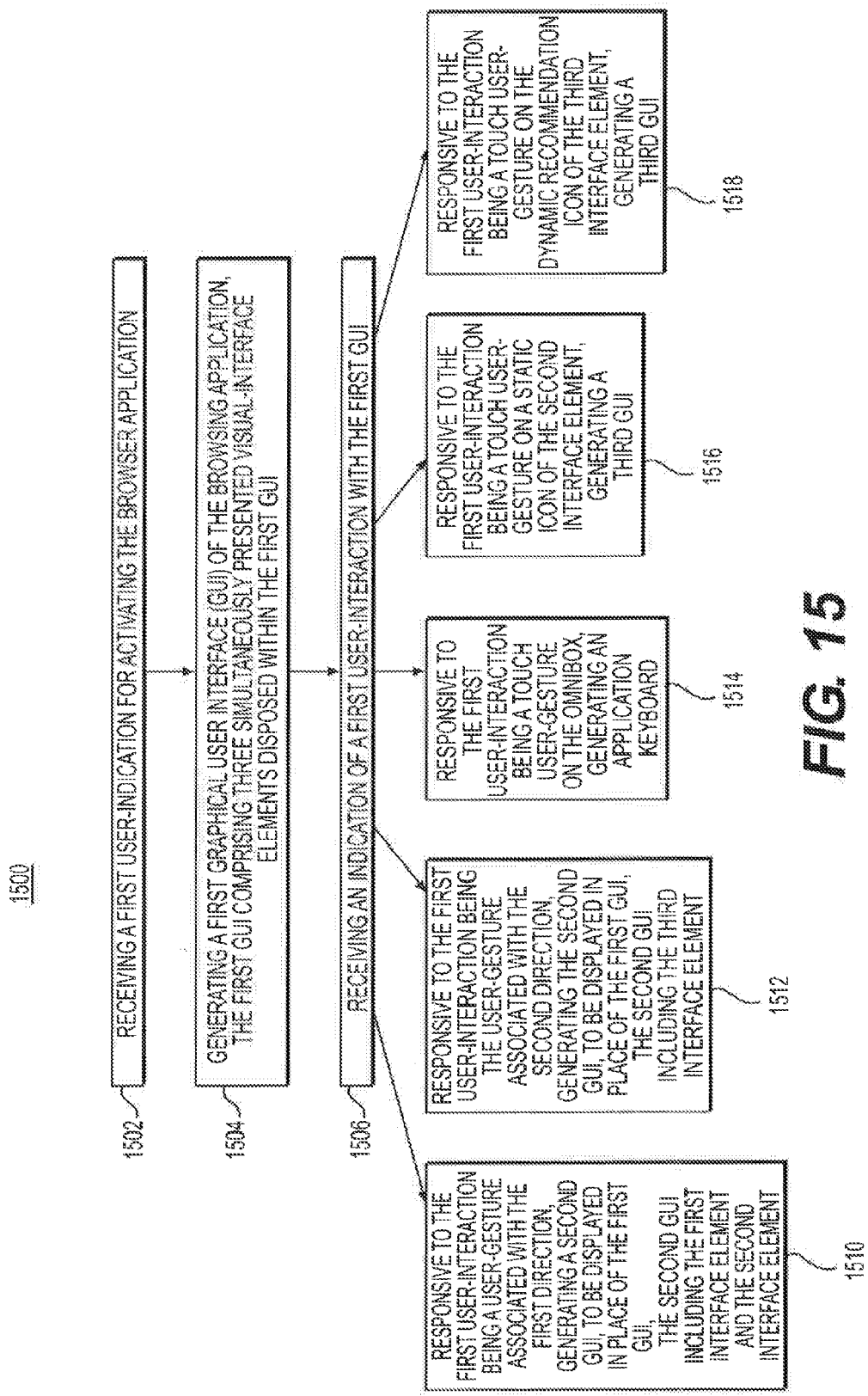
FIG. 15 is a flow chart of a method, the method being implemented in accordance with an embodiment of the present technology.

FIG. 15 shows a flowchart illustrating a computer-implemented method 1500 for generating a GUI in a browser application for a user of an electronic device. In some embodiments, the method 1500 may be (completely or partially) implemented on the browser application 215 running the electronic device 210.

Step 1502: Receiving a First User-Indication for Activating the Browser Application The method 1500 starts at a step 1502 by receiving, via the user-interface device, a first user-indication for activating the browser application. The first user-indication may come directly from the user 170 pressing the icon of the browser application 215 on her/his electronic device 210, or may come from another application the user 170 is running on her/his electronic device 210. In some embodiments, the user 170 may have started the browser application on her/his electronic device 210 via another electronic device, such as a computer, a tablet, a wearable device, etc.

Step 1504: Generating a First Graphical User Interface (GUI) of the Browsing Application, the First GUI Comprising Three Simultaneously Presented Visual-Interface Elements Disposed within the First GUI At a step 1504, responsive to the first user-indication, the electronic device 210 may start the browser application 215 and generate a first GUI 300 of the browser application 215, the first GUI 300 comprising three simultaneously presented visual interface elements disposed within the first GUI: a first interface element 310 being an omnibox 314, the omnibox 314 configured to receive any one of a network address and a search query, the first interface element 310 being located substantially in a center of the first GUI 300, a second interface element 320 being at least one icon representing user-selected content, each of the at least one icons being linked to an associated network resource accessible via the communication network 220, the second interface element 320 being spaced a first distance away, in a first direction, from the first interface element 310 and a third interface element 330 being at least one recommendation icon, the first recommendation icon 340 associated with recommended content selected, by the server 222, from a plurality of potentially recommendable content items, the third interface element 330 being spaced a second distance away, in a second direction, from the first interface element 310, the second direction being opposite to the first direction.

In some embodiments, if the user 170 has the electronic device 210 rotated in landscape mode, only a subset of the first GUI may be displayed, such as first interface element 310 and the second interface element 320, not including the third interface element 330. The method 1500 may then proceed to step 1506.

Step 1506: Receiving an Indication of a First User-Interaction with the First GUI A step 1506, after a certain period of time, the user 170 may want to interact with the first GUI 300 for a variety of reasons: the user 170 may want to access a network resource via the omnibox 314, make a search via the omnibox 314, access a network resource in the second interface element 320 or access recommended content in the third interface element 330. The browser application 215 may receive an indication of a first user-interaction with the first GUI. The method 1500 may then go to a step 1510, a step 1512, a step 1514, a step 1516 or a step 1518.

STEP 1510: responsive to the first user-interaction being a user-gesture associated with the first direction, generating a second GUI, to be displayed in place of the first GUI, the second GUI including the first interface element and the second interface element.

The user 170 may want to actuate the browser application 215 to the second interface element 320 to access a previously saved icon linked to a network resource. The user 170 may swipe the screen in the first direction, a downward direction. At a step 1510, responsive to the user-interaction being a user-gesture associated with the first direction, the browser application 215 may generate a second GUI 400, wherein the first GUI 300 may transition to the second GUI 400 in the form of an animation, as explained in FIG. 12*a*-12*c*. The second GUI 400 includes the omnibox 314 located at an extremity of the second GUI 400 located in the first direction; and the entire second interface element 430 located such that the first distance is collapsed. Furthermore, the second GUI 400 does not include the third interface element 330.

The user 170 may then access the desired network resource by tapping on the icon associated with the network resource, and third GUI (not depicted) may be generated by the browser application 215, the third GUI being part of a new window of the browser application 215. In some embodiments, the user 170 may want to move, delete or modify a icon on the entire second interface element 430, and may do so by performing a long press user-gesture on any part of the second interface element 420, as described in FIG. 11.

Step 1512: Responsive to the First User-Interaction being the User-Gesture Associated with the Second Direction, Generating the Second GUI, to be Displayed in Place of the First GUI, the Second GUI Including the Third Interface Element.

The user 170 may want to explore the third interface element 330 to access a recommendation icon associated with a recommended content. The user 170 may swipe the screen in the second direction, an upward direction. At a step 1512, responsive to the user-interaction being the user-gesture associated with the second direction, the browser application 215 may generate a second GUI 500 to be displayed in in place of the first GUI 300, the second GUI 500 including the entire third interface element 510, such that at least one recommendation icon includes a first recommendation icon 540 and at least a second recommendation icon 550, the first recommendation icon 540 to be displayed in its entirety and the at least the second recommendation icon 550 to be at least partially displayed. Furthermore, the second GUI 500 does not include the first interface element 310 and the second interface element 320. The user 170 may then continue swiping to access other recommendation icons, or may tap on a recommendation icon to access the recommended content that is associated with a network resource, and in response a third GUI may be generated by the browser application, the third GUI being part of a new window of the browser application 215.

Step 1514: Responsive to the First User-Interaction being a Touch User-Gesture on the Omnibox, Generating the Application Keyboard The user 170 may touch the omnibox 314 to type a search request or a network resource address. At a step 1514, in response, the browser application 215 may generate the application keyboard 830 to be part of the first GUI 800, the first GUI 800 including the first interface element 310 being located substantially in a center of the first GUI 800, the second interface element 320 and the application keyboard 830 to input a text in the omnibox 314, as depicted in FIG. 8.

Step 1516: Responsive to the First User-Interaction being a Touch User-Gesture on a Icon of the Second Interface Element, Generating a Third GUI The user 170 may want to access a network resource associated with a icon of the second interface element 320, and may directly touch the icon from the first GUI 300. At a step 1516, responsive to the first user-interaction being a touch user-gesture on the icon of the second interface element 320, the browser application 215 may be configured to access the associated network resource linked to the icon by generating a third GUI, the third GUI being part of a new window of the browser application 215. In some embodiments, the user 170 may directly want to access a network resource associated with a icon displayed on the second interface element 320, visible from the first GUI 300. Instead of swiping to the second GUI 400, the user may directly touch the icon to access network resource linked to the static.

Step 1518: Responsive to the First User-Interaction being a Touch User-Gesture on the Recommendation Icon of the Third Interface Element, Generating a Third GUI The user 170 may want to access a network resource associated with the first recommendation icon 340 on the second interface element 420, and may directly touch the icon from the first GUI 300. At a step 1518, responsive to the first user-interaction being a touch user-gesture on the recommendation icon of the third interface element, the browser application 215 may be configured to access the associated network resource linked to the recommendation icon by generating a third GUI, the third GUI being part of a new window of the browser application. In some embodiments, the user 170 may directly want to access a recommended content associated with a first recommendation icon 340 part of the third interface element 330 visible from the first GUI 300. Instead of swiping to the second GUI 500, the user may directly touch the first recommendation icon 340 to access network resource linked to the recommended content associated with the first recommendation icon 340.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

CLAUSE 1. A computer-implemented method (1500) of generating a content recommendation interface for a user (170) of an electronic device (210), the method (1500) executable by the electronic device (210), the electronic device (210) having a processor (110) and a user-interface device coupled to the processor (110), the processor (110) being configured to execute a browser application (215), the electronic device (210) further comprising a network interface for connecting to a recommendation server (222) via a communication network (220), the method (1500) comprising: receiving, via the user-interface device, a first user-indication for activating the browser application (215); responsive to the first user-indication, generating on the user-interface device a first graphical user interface (GUI) (300) of the browsing application, the first GUI (300) comprising three simultaneously presented visual-interface elements disposed within the first GUI (300): a first interface element (310) comprising an omnibox (314), the omnibox (314) configured to receive any one of a network address and a search query (1020), the first interface element (310) being located substantially in a center of the first GUI (300); a second interface element (320) comprising at least one icon representing user-selected content, each of the at least one icons being linked to an associated network resource accessible via the communication network (220), the second interface element (320) being spaced a first distance away, in a first direction, from the first interface element (310); a third interface element (330) comprising at least one recommendation icon, the first recommendation icon (340) associated with recommended content selected, by the recommendation server (222), from a plurality of potentially recommendable content items, the third interface element (330) being spaced a second distance away, in a second direction, from the first interface element (310), the second direction being opposite to the first direction; receiving, via the user-interface device, an indication of a first user-interaction with the first GUI (300); responsive to determining the first user-interaction being a user-gesture associated with the first direction, generating a second GUI (400), to be displayed in place of the first GUI (300), the second GUI (400) including: a portion of the first interface element (310) located at an extremity of the second GUI (400) located in the first direction; and the second interface element (320) located such that the first distance is collapsed; and not including the third interface element (330); responsive to determining the first user-interaction being the user-gesture associated with the second direction, generating the second GUI (500), to be displayed in place of the first GUI (300), the second GUI (500) including: the third interface element (330), such that at least one recommendation icon includes a first recommendation icon (540) and at least a second recommendation icon (550), the first recommendation icon (540) to be displayed in its entirety and the at least the second recommendation icon (550) to be at least partially displayed; and not including the first interface element (310) and the second interface element (320).

CLAUSE 2. The method (1500) of claim 1, further comprising determining a proportion of the first GUI (300) dedicated to the second interface element (320) and the third interface element (330); and wherein the determining is based on a parameter of the user-interface device.

CLAUSE 3. The method (1500) of claim 2, further comprising determining the first distance and the second distance; and wherein the determining is based on a parameter of the user-interface device.

CLAUSE 4. The method (1500) of claim 1, further comprising receiving, from the recommendation server (222), an indication of the recommended content selected, by the recommendation server (222), from the plurality of potentially recommendable content items, the selection having been executed specifically for the user.

CLAUSE 5. The method (1500) of claim 4, wherein the recommendation icon is linked to an associated recommended content item available from an associated network resource accessible via the communication network.

CLAUSE 6. The method (1500) of claim 5, wherein responsive to the first user-interaction being a touch user-gesture on the recommendation icon of the third interface element (330), accessing the associated network resource linked to the recommendation icon by generating the third GUI, the third GUI being part of a new window of the browser application (215).

CLAUSE 7. The method (1500) of claim 1, wherein the method (1500) further comprises, responsive to the first user-interaction being a touch user-gesture on the omnibox (314), generating the second GUI, the second GUI including: the first interface element (310) being located substantially in a center of the second GUI; the second interface element (320); and an application keyboard (830) for inputting a text in the omnibox (314).

CLAUSE 8. The method (1500) of claim 1, wherein responsive to the first user-interaction being a touch user-gesture on the icon of the second interface element (320), accessing the associated network resource linked to the icon by generating a third GUI, the third GUI being part of a new window of the browser application (215).

CLAUSE 9. The method (1500) of claim 1, further comprising displaying an edit screen of the second interface element (320) on the second GUI responsive to a long press user-gesture on the second interface element (320).

CLAUSE 10. The method (1500) of claim 1, further comprising executing an animated transition between the first GUI (300) and the second GUI (400, 500) responsive to the user-gesture.

CLAUSE 11. The method (1500) of claim 5, further comprising determining a parameter of the animated transition, the parameter including at least a speed of transition, the determining comprising: receiving a first location and a first time (1422) of the user-gesture; receiving a second location (1426) and a second time (1426) of the user-gesture; determining the speed of transition by computing the difference between the second location (1426) and the first location (1422) and the difference between the second time (1426) and the first time (1422) of the user-gesture.

CLAUSE 12. The method (1500) of claim 1, wherein the determining the first user-interaction being the user-gesture associated with the first direction comprises: receiving a first location of the user-gesture; receiving a second location of the user-gesture; and computing a difference between the second location and the first location of the user-gesture.

CLAUSE 13. The method (1500) of claim 1, wherein the determining the first user-interaction being the user-gesture associated with the second direction comprises: receiving a first location of the user-gesture; receiving a second location of the user-gesture; and computing the difference between the second location and the first location of the user-gesture.

CLAUSE 14. The method (1500) of claim 1, wherein responsive to receiving an indication of the user (170) rotating the electronic device (210) to a second orientation, displaying a subset of the first GUI (300) as the first GUI (300).

CLAUSE 15. The method (1500) of claim 1, wherein responsive to receiving an indication of the user (170) rotating the electronic device (210) to the second orientation, displaying a superset of the first GUI (300) as the first GUI (300).

CLAUSE 16. The method (1500) of claim 1, further comprising:

receiving, via the user-interface device, an indication of a second user-interaction with the second GUI (500), the second GUI (500) including the third interface element (330) and not including the first interface element (310) and the second interface element (320);

responsive to determining the second user-interaction with the second GUI (500) being the user-gesture associated with the second direction, generating on the second interface element (320), a third recommendation icon (710) and at least a fourth recommendation icon (720), the third recommendation icon (710) to be displayed in its entirety and the at least the fourth recommendation icon (720) to be at least partially displayed.

CLAUSE 17. The method (1500) of claim 15, wherein the third recommendation icon (710) is the second recommendation icon (550).

CLAUSE 18. A system (200) for generating a content recommendation interface for a user (170) of an electronic device (210), the electronic device (210) having at least one processor (110) and a user-interface device coupled to the processor (110), the processor (110) being configured to execute a browser application (215), the electronic device (210) further comprising a network interface for connecting to a recommendation server (222) via a communication network (220), the processor (110) being structured and configured to: receive, via the user-interface device, a first user-indication for activating the browser application (215); responsive to the first user-indication, generate on the user-interface device a first graphical user interface (GUI) (300) of the browsing application, the first GUI (300) comprising three simultaneously presented visual-interface elements disposed within the first GUI (300): a first interface element (310) comprising an omnibox (314), the omnibox (314) configured to receive any one of a network address and a search query (1020), the first interface element (310) being located substantially in a center of the first GUI (300); a second interface element (320) comprising at least one icon representing user-selected content, each of the at least one icons being linked to an associated network resource accessible via the communication network (220), the second interface element (320) being spaced a first distance away, in a first direction, from the first interface element (310); a third interface element (330) comprising at least one recommendation icon, the first recommendation icon (340) associated with recommended content selected, by the recommendation server (222), from a plurality of potentially recommendable content items, the third interface element (330) being spaced a second distance away, in a second direction, from the first interface element (310), the second direction being opposite to the first direction; receive, via the user-interface device, an indication of a first user-interaction with the first GUI (300); responsive to determining the first user-interaction being a user-gesture associated with the first direction, generate a second GUI (400), to be displayed in place of the first GUI (300), the second GUI (400) including: a portion of the first interface element (310) located at an extremity of the second GUI (400) located in the first direction; and the second interface element (320) located such that the first distance is collapsed; and not including the third interface element (330); responsive to determining the first user-interaction being the user-gesture associated with the second direction, generate the second GUI (500), to be displayed in place of the first GUI (300), the second GUI (500) including: the third interface element (330), such that at least one recommendation icon includes a first recommendation icon (540) and at least a second recommendation icon (550), the first recommendation icon (540) to be displayed in its entirety and the at least the second recommendation icon (550) to be at least partially displayed; and not including the first interface element (310) and the second interface element (320).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of generating a content recommendation interface for a user of an electronic device, the method executable by the electronic device, the electronic device having a processor and a user-interface device coupled to the processor, the processor being configured to execute a browser application, the electronic device further comprising a network interface for connecting to a recommendation server via a communication network, the method comprising:
receiving, via the user-interface device, a first user-indication for activating the browser application;
responsive to the first user-indication, generating on the user-interface device a first graphical user interface (GUI) of the browsing application, the first GUI comprising three simultaneously presented visual-interface elements disposed within the first GUI:
a first interface element comprising an omnibox, the omnibox configured to receive at least one of a network address and a search query, the first interface element being located substantially in a center of the first GUI;
a second interface element comprising at least one icon representing user-selected content, each of the at least one icons being linked to an associated network resource accessible via the communication network, the second interface element being spaced a first distance away, in a first direction, from the first interface element;
a third interface element comprising at least one recommendation icon, the first recommendation icon associated with recommended content selected, by the recommendation server, from a plurality of potentially recommendable content items,
the third interface element being spaced a second distance away, in a second direction, from the first interface element, the second direction being opposite to the first direction;
the at least one recommendation icon including a first recommendation icon being partially visible within the first GUI;
receiving, via the user-interface device, an indication of a first user-interaction with the first GUI;
responsive to determining the first user-interaction being a user-gesture associated with the first direction, generating a second GUI, to be displayed in place of the first GUI, the second GUI including:
a portion of the first interface element located at an extremity of the second GUI located in the first direction; and
the second interface element located such that the first distance is collapsed; and
not including the third interface element;
responsive to determining the first user-interaction being the user-gesture associated with the second direction, generating the second GUI, to be displayed in place of the first GUI, the second GUI including:
the third interface element, such that at least one recommendation icon includes the first recommendation icon and at least a second recommendation icon, the first recommendation icon to be displayed in its entirety and
the at least the second recommendation icon to be at least partially displayed; and
not including the first interface element and the second interface element;
executing an animated transition between the first GUI and the second GUI responsive to the user-gesture; and
determining a parameter of the animated transition, the parameter including at least a speed of transition, the determining comprising:
receiving a first location and a first time of the user-gesture,
receiving a second location and a second time of the user-gesture, and
determining the speed of transition by computing the difference between the second location and the first location and the difference between the second time and the first time of the user-gesture.

2. The method of claim 1, further comprising determining a proportion of the first GUI dedicated to the second interface element and the third interface element; and wherein the determining is based on a parameter of the user-interface device.

3. The method of claim 2, further comprising determining the first distance and the second distance; and wherein the determining is based on a parameter of the user-interface device.

4. The method of claim 1, further comprising receiving an indication of the recommended content selected from the plurality of potentially recommendable content items, the selection having been executed specifically for the user.

5. The method of claim 4, wherein the recommendation icon is linked to an associated recommended content item available from an associated network resource accessible via the communication network.

6. The method of claim 5, wherein responsive to the first user-interaction being a touch user-gesture on the recommendation icon of the third interface element, accessing the associated network resource linked to the recommendation icon by generating the third GUI, the third GUI being part of a new window of the browser application.

7. The method of claim 1, wherein the method further comprises, responsive to the first user-interaction being a touch user-gesture on the omnibox, generating an application keyboard to be part of the first GUI, the first GUI including:
the first interface element being located substantially in a center of the first GUI;
the second interface element; and
an application keyboard for inputting a text in the omnibox.

8. The method of claim 1, wherein responsive to the first user-interaction being a touch user-gesture on the icon of the second interface element, accessing the associated network resource linked to the icon by generating a third GUI, the third GUI being part of a new window of the browser application.

9. The method of claim 1, further comprising displaying an edit screen of the second interface element on the second GUI responsive to a long press user-gesture on the second interface element.

10. The method of claim 1, wherein the determining the first user-interaction being the user-gesture associated with the first direction comprises:
receiving a first location of the user gesture;
receiving a second location of the user gesture; and
computing a difference between the second location and the first location of the user gesture.

11. The method of claim 1, wherein the determining the first user-interaction being the user-gesture associated with the second direction comprises:
receiving a first location of the user gesture;
receiving a second location of the user gesture; and
computing the difference between the second location and the first location of the user gesture.

12. The method of claim 1, wherein responsive to receiving an indication of the user rotating the electronic device to a second orientation, displaying a subset of the first GUI as the first GUI.

13. The method of claim 1, wherein responsive to receiving an indication of the user rotating the electronic device to the second orientation, displaying a superset of the first GUI as the first GUI.

14. The method of claim 1, further comprising:
receiving, via the user-interface device, an indication of a second user-interaction with the second GUI, the second GUI including the third interface element and not including the first interface element and the second interface;
responsive to determining the second user-interaction with the second GUI being the user-gesture associated with the second direction, generating on the second interface element, a third recommendation icon and at least a fourth recommendation icon, the third recommendation icon to be displayed in its entirety and the at least the fourth recommendation icon to be at least partially displayed.

15. The method of claim 13, wherein the third recommendation icon is the second recommendation icon.

16. A system for generating a content recommendation interface for a user of an electronic device, the electronic device having at least one processor and a user-interface device coupled to the processor, the processor being configured to execute a browser application, the electronic device further comprising a network interface for connecting to a recommendation server via a communication network, the processor structured and configured to:
receive, via the user-interface device, a first user-indication for activating the browser application;
responsive to the first user-indication, generate on the user-interface device a first graphical user interface (GUI) of the browsing application, the first GUI comprising three simultaneously presented visual-interface elements disposed within the first GUI:
a first interface element comprising an omnibox, the omnibox configured to receive at least one of a network address and a search query, the first interface element being located substantially in a center of the first GUI;
a second interface element comprising at least one icon representing user-selected content, each of the at least one icons being linked to an associated network resource accessible via the communication network, the second interface element being spaced a first distance away, in a first direction, from the first interface element;
the at least one recommendation icon including a first recommendation icon being partially visible within the first GUI;
a third interface element comprising at least one recommendation icon, the first recommendation icon associated with recommended content selected, by the recommendation server, from a plurality of potentially recommendable content items, the third interface element being spaced a second distance away, in a second direction, from the first interface, the second direction being opposite to the first direction;
receive, via the user-interface device, an indication of a first user-interaction with the first GUI;
responsive to determining the first user-interaction being a user-gesture associated with the first direction, generate a second GUI, to be displayed in place of the first GUI, the second GUI including:
a portion of the first interface element located at an extremity of the second GUI located in the first direction; and
the second interface element located such that the first distance is collapsed; and
not including the third interface element;
responsive to determining the first user-interaction being the user-gesture associated with the second direction, generate the second GUI, to be displayed in place of the first GUI, the second GUI including:
the third interface element, such that at least one recommendation icon includes the first recommendation icon and at least a second recommendation icon, the first recommendation icon to be displayed in its entirety and the at least the second recommendation icon to be at least partially displayed; and not including the first interface element and the second interface element;

executing an animated transition between the first GUI and the second GUI responsive to the user-gesture; and determine a parameter of the animated transition, the parameter including at least a speed of transition, to determine the parameter the processor being further structured and configured to:
receive a first location and a first time of the user-gesture,
receive a second location and a second time of the user-gesture, and
determine the speed of transition by computing the difference between the second location and the first location and the difference between the second time and the first time of the user-gesture.

* * * * *